Sept. 25, 1945.  E. R. FAUSSET ET AL  2,385,619
ARMATURE COIL LEAD STAKING MACHINE
Filed Nov. 13, 1943  19 Sheets-Sheet 1

INVENTORS
ERNEST R. FAUSSET AND
FOREST L. ZION
BY
Spencer Hardman & Fehr
THEIR ATTORNEYS

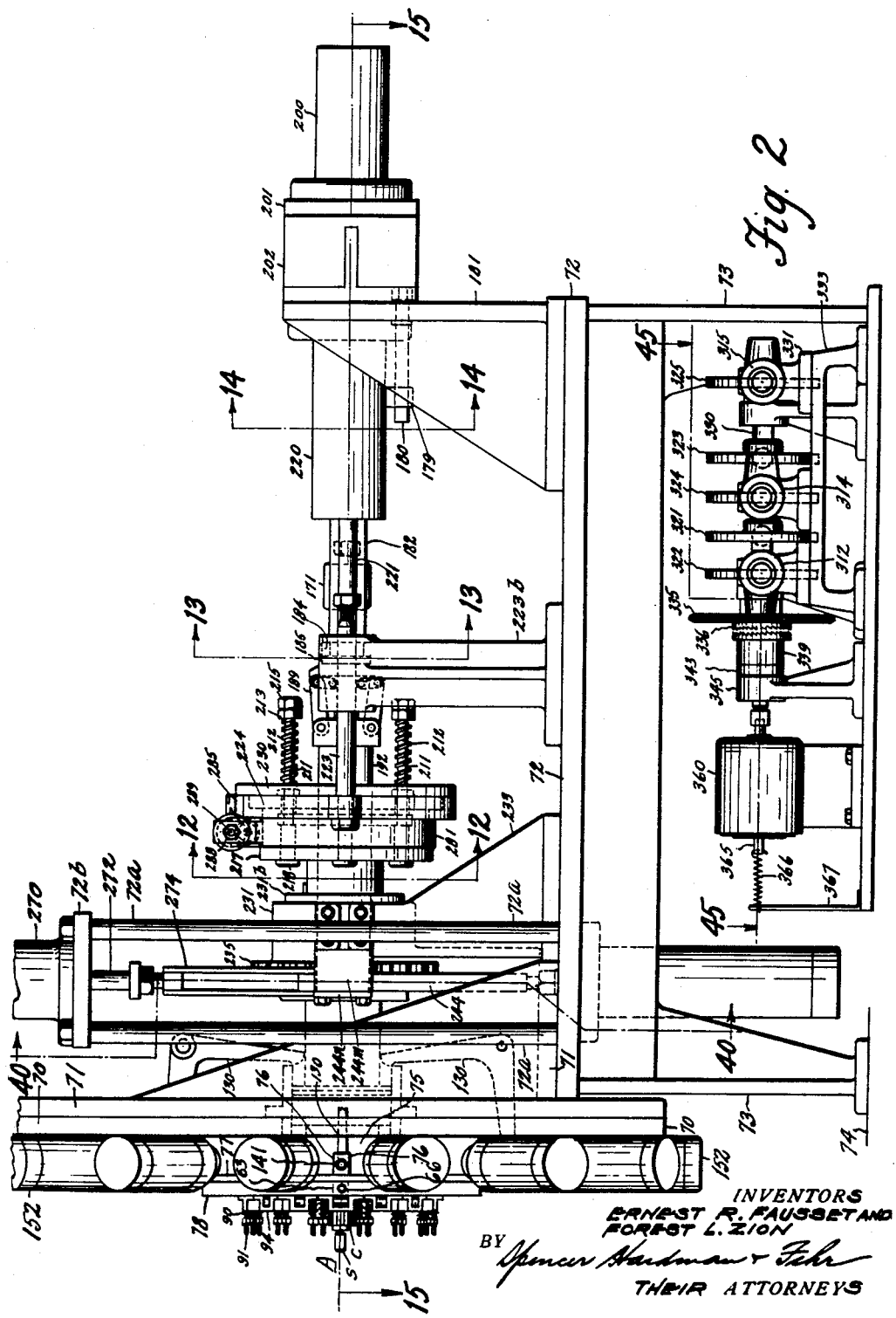

Sept. 25, 1945.  E. R. FAUSSET ET AL  2,385,619
ARMATURE COIL LEAD STAKING MACHINE
Filed Nov. 13, 1943  19 Sheets-Sheet 3
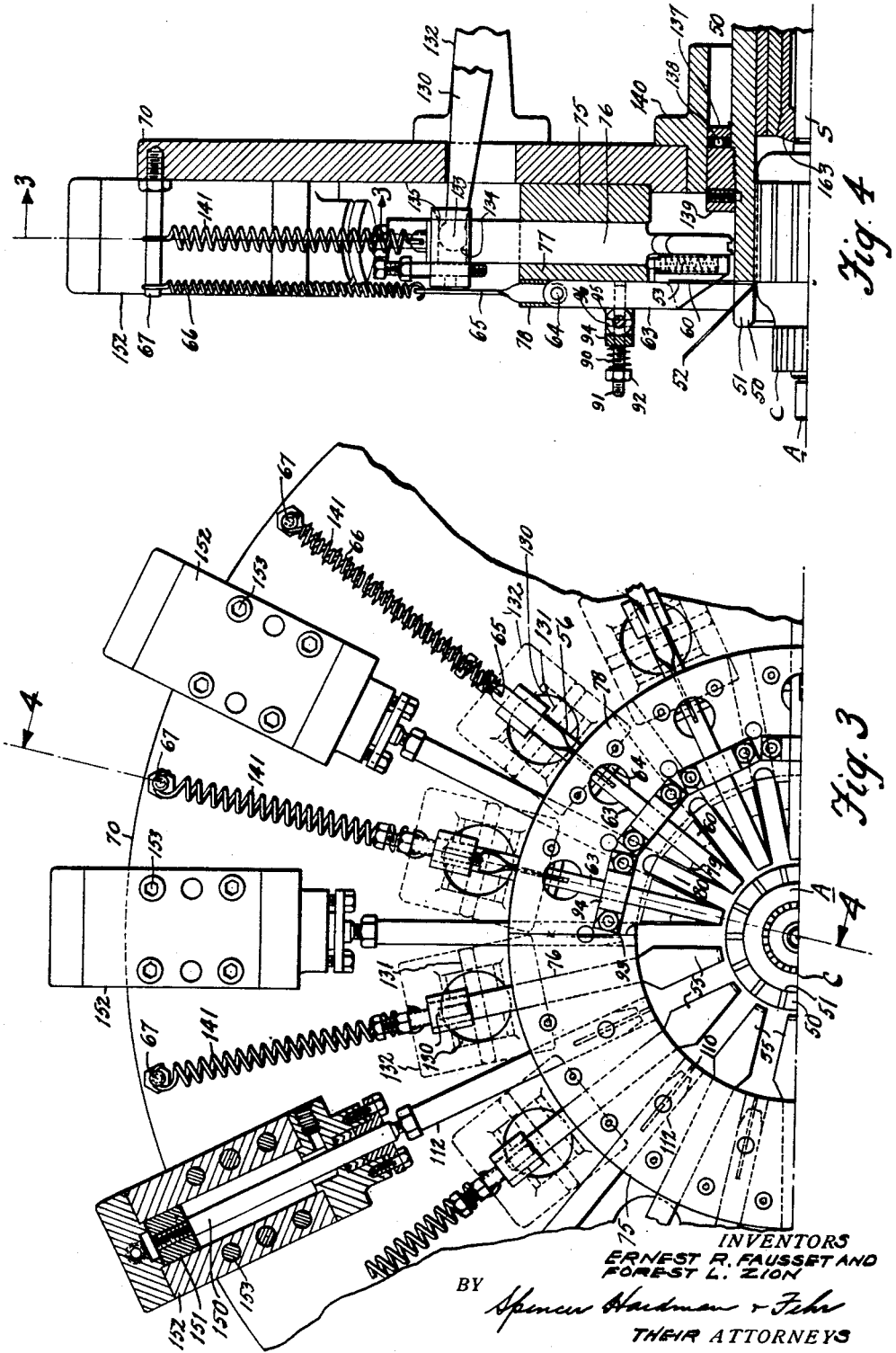
INVENTORS
ERNEST R. FAUSSET AND
FOREST L. ZION
BY
THEIR ATTORNEYS

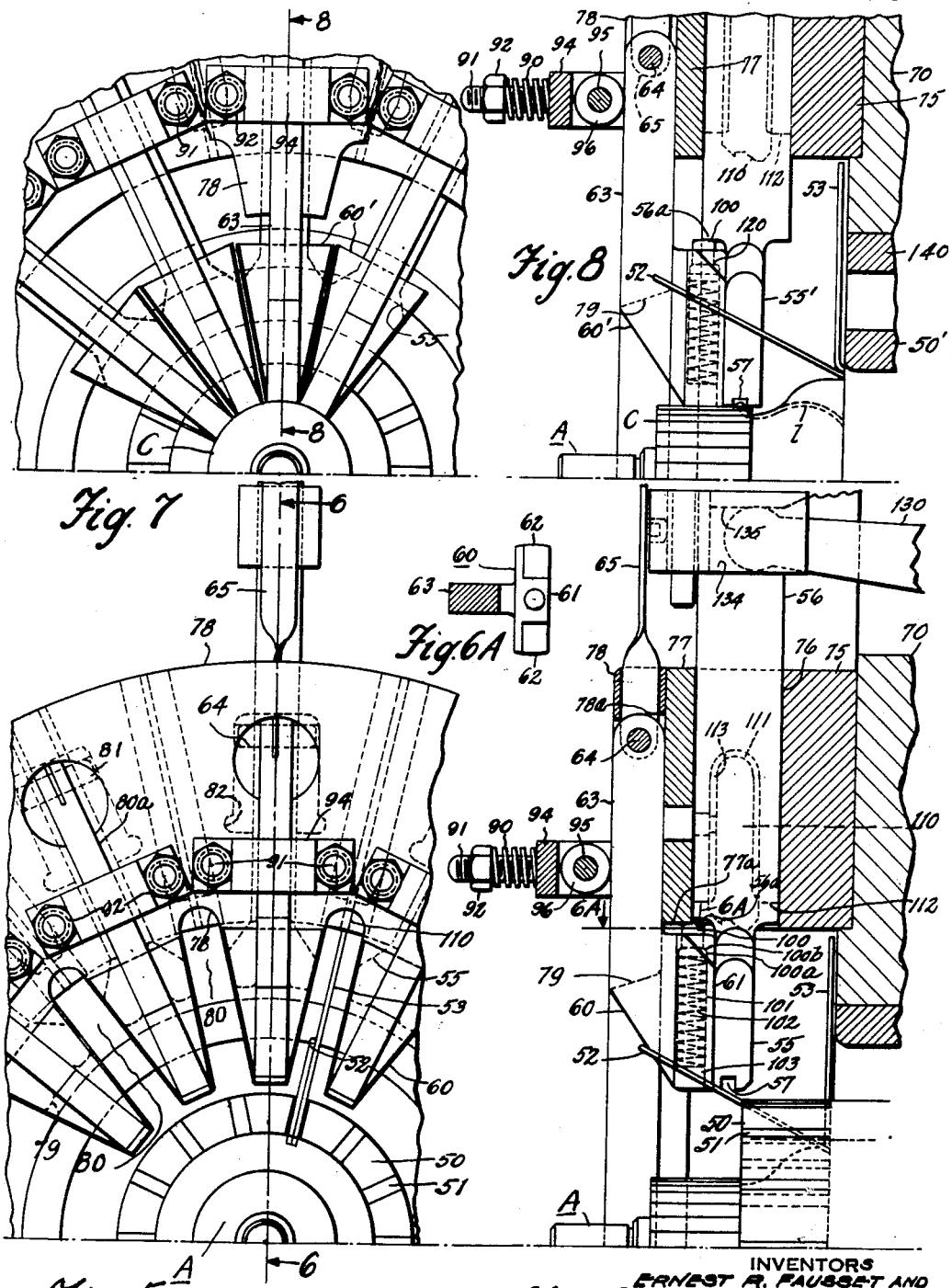

Sept. 25, 1945. E. R. FAUSSET ET AL 2,385,619
ARMATURE COIL LEAD STAKING MACHINE
Filed Nov. 13, 1943 19 Sheets-Sheet 5
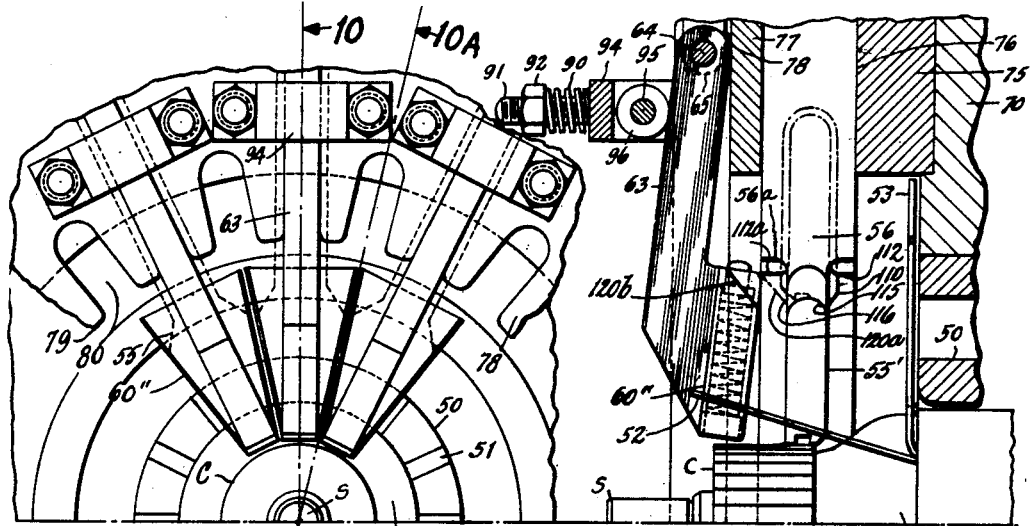
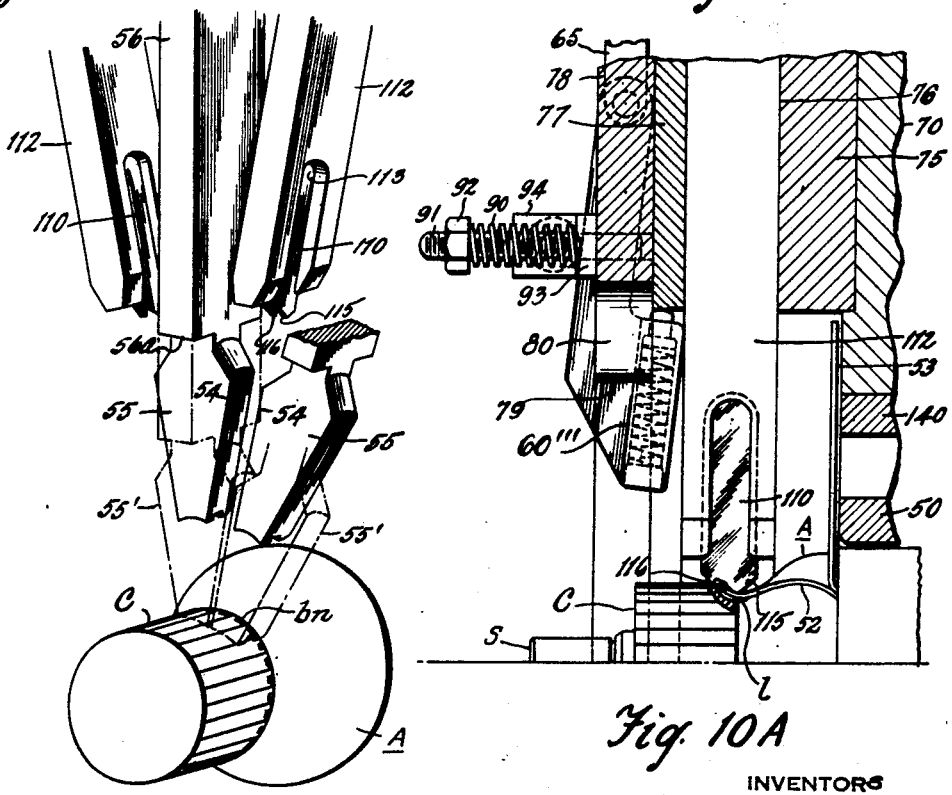
Fig. 9
Fig. 10
Fig. 11
Fig. 10A
INVENTORS
ERNEST R. FAUSSET AND
FOREST L. ZION
BY
THEIR ATTORNEYS Sept. 25, 1945.  E. R. FAUSSET ET AL  2,385,619
ARMATURE COIL LEAD STAKING MACHINE
Filed Nov. 13, 1943    19 Sheets-Sheet 6

INVENTORS
ERNEST R. FAUSSET AND
FOREST L. ZION
BY
THEIR ATTORNEYS

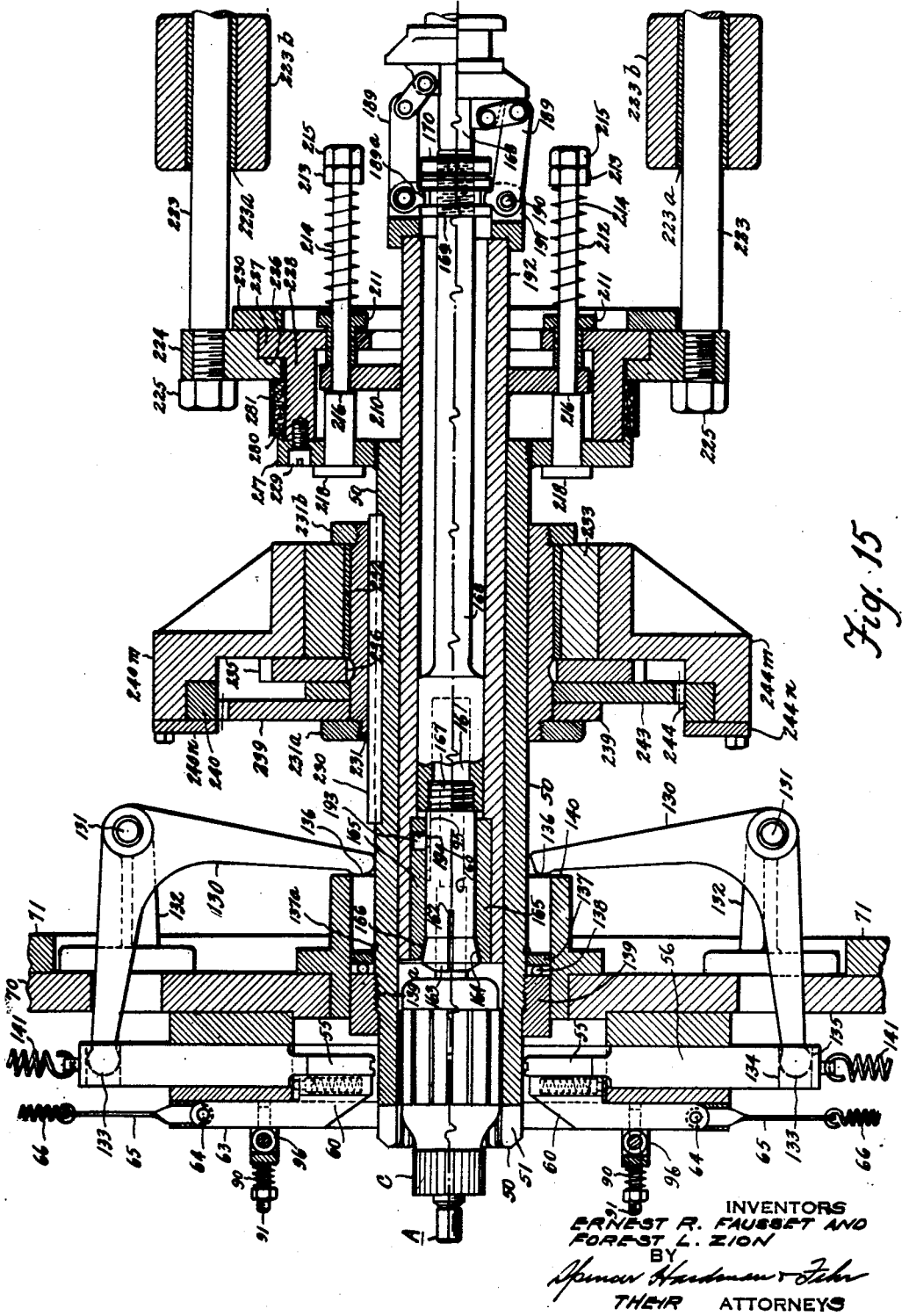

Sept. 25, 1945.   E. R. FAUSSET ET AL   2,385,619
ARMATURE COIL LEAD STAKING MACHINE
Filed Nov. 13, 1943   19 Sheets-Sheet 8

INVENTORS
ERNEST R. FAUSSET
AND
BY FOREST L. ZION
THEIR ATTORNEYS

Sept. 25, 1945.  E. R. FAUSSET ET AL  2,385,619
ARMATURE COIL LEAD STAKING MACHINE
Filed Nov. 13, 1943  19 Sheets-Sheet 10

INVENTORS
ERNEST R. FAUSSET AND
FOREST L. ZION
BY
THEIR ATTORNEYS

Sept. 25, 1945.   E. R. FAUSSET ET AL   2,385,619
ARMATURE COIL LEAD STAKING MACHINE
Filed Nov. 13, 1943   19 Sheets-Sheet 13

INVENTORS
ERNEST R. FAUSSET AND
FOREST L. ZION
by James Hardman + John
THEIR ATTORNEYS Sept. 25, 1945.　　　E. R. FAUSSET ET AL　　　2,385,619
ARMATURE COIL LEAD STAKING MACHINE
Filed Nov. 13, 1943　　　19 Sheets-Sheet 14

INVENTORS
ERNEST R. FAUSSET AND
FOREST L. ZION
by Spencer Hardman & John
THEIR ATTORNEYS

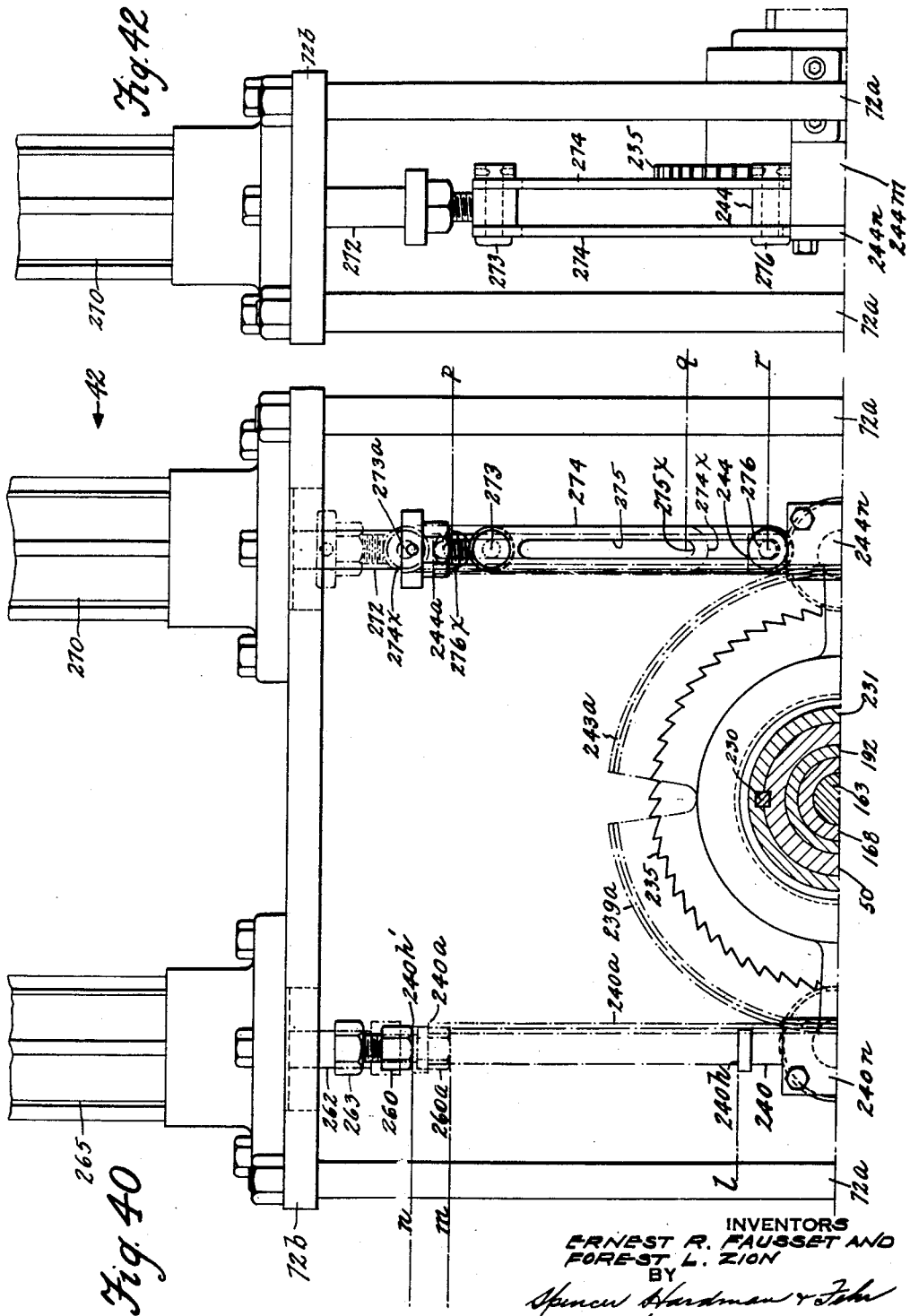

Sept. 25, 1945. E. R. FAUSSET ET AL 2,385,619
ARMATURE COIL LEAD STAKING MACHINE
Filed Nov. 13, 1943 19 Sheets-Sheet 16
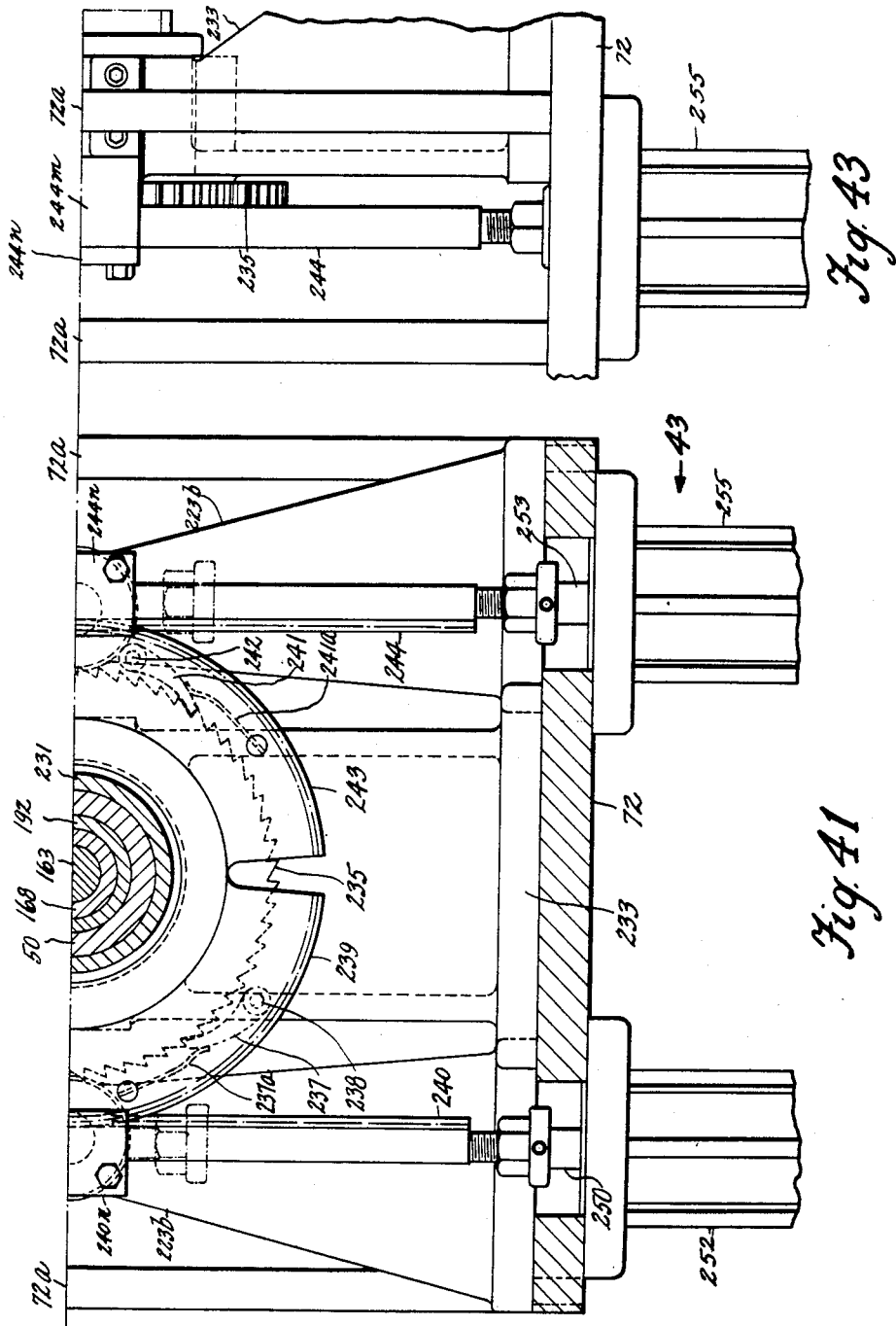
INVENTORS
ERNEST R. FAUSSET AND
FOREST L. ZION
BY
THEIR ATTORNEYS Sept. 25, 1945.    E. R. FAUSSET ET AL    2,385,619
ARMATURE COIL LEAD STAKING MACHINE
Filed Nov. 13, 1943    19 Sheets-Sheet 17

INVENTORS
ERNEST R. FAUSSET AND
FOREST L. ZION
BY
Spencer Hardman & Fehr
THEIR ATTORNEYS

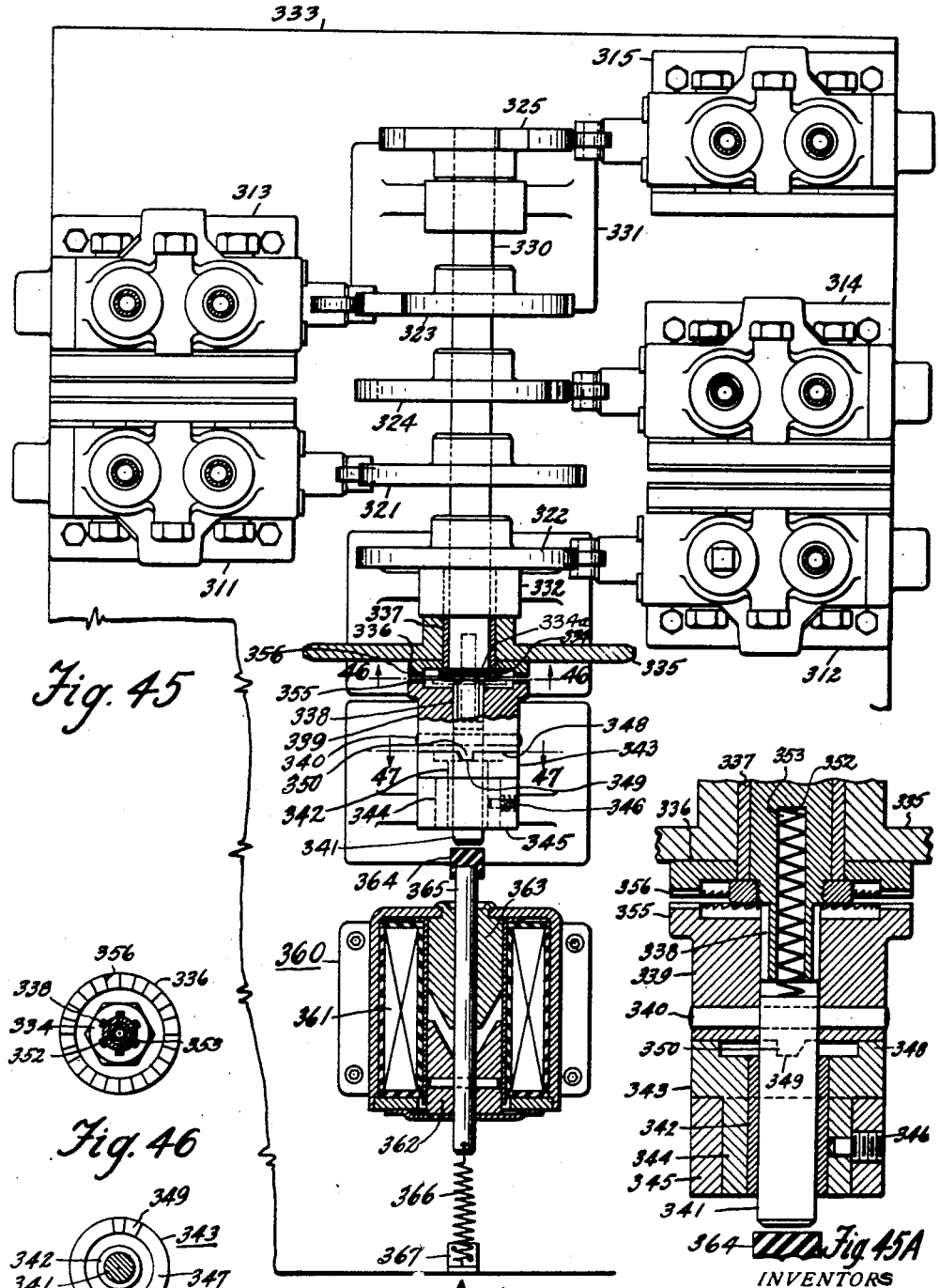

Patented Sept. 25, 1945

2,385,619

UNITED STATES PATENT OFFICE 2,385,619

ARMATURE COIL LEAD STAKING MACHINE

Ernest R. Fausset, Ingalls, and Forest L. Zion, Anderson, Ind., assignors to General Motors Corporation, Detroit, Mich., a corporation of Delaware Application November 13, 1943, Serial No. 510,158

22 Claims. (Cl. 29—205)

This invention relates to the manufacture of an armature for a dynamo electric machine and more particularly to an armature having a slotted core supporting armature coils, each slot of the core receiving two active coil sides of different armature coils. The present invention relates, for example, to the type of armature shown in Edward W. Collins, Patent No. 2,074,366, granted March 23, 1937. This patent describes and claims a machine which places active coil sides of preformed armature coils in the bottoms of the armature core slots and connects those coil leads which emerge from the bottoms of the core slots with the proper commutator segments. The other active sides of the armature coils are placed in the top portions of the armature core slots by machines such as described and claimed in Lora E. Poole Patent No. 2,192,801 granted March 5, 1940, and E. W. Collins et al., Patent No. 2,281,-917 granted May 5, 1942. Those leads emerging from the top portions of the armature core slots are secured to the proper commutator segments by machines such as shown in Poole, Patent No. 2,056,534, granted October 6, 1936. Each operation of the coil lead staking device shown in the last mentioned patent stakes one coil lead and severs the excess of wire at the end of the lead after that lead has been placed by the machine operator in alignment with that notch of the commutator segment which is to receive the lead.

For example, in the case of an armature having 14 slots, each containing active coil sides of two double wound armature coils, the commutator has 28 segments or bars each of which is notched to receive two coil leads. The armature assembling machine, Patent No. 2,074,366 will perform 14 operations by which 14 active coil sides are placed in the bottoms of the slots. During each operation two coil leads emerging from the bottom portion of a slot will be placed in the bottoms of the notches of two adjacent commutator bars. The machine of Patent No. 2,281,917 will perform 14 operations to place active coil sides in each of the armature slots in predetermined spaced relation with respect to its slot which already contain coil sides. The coil lead staking device of Patent No. 2,056,534 will perform 28 operations during each of which an armature coil lead is placed in the upper portion of a notch of a commutator bar, said bar being displaced a predetermined angular distance from the core slot from which the lead emerges.

It is an object of the present invention to provide a machine by which the placing of a plurality of leads within the notches of the proper commutator bars is effected simultaneously and the excess of wire is removed simultaneously.

More particularly it is an object of the present invention to provide a machine for simultaneously attaching to commutator bars the leads of a plurality of double wire armature coils. Therefore it is an object to provide a machine which performs its operation in two cycles as follows: During the first cycle, one-half the total number of coils emerging from near the top of the core slots are simultaneously placed within the notches of alternate commutator bars (one-half the total number) and the projecting ends of these leads are simultaneously cut-off, each bar being angularly displaced a predetermined distance from the core slot from which the lead emerges. During the second cycle the remaining leads which emerge from the top portions of the armature slots are placed simultaneously within the notches of the other commutator bars, each bar being angularly displaced, with respect to the slot from which the lead emerges, a distance which is different from the angular displacement of the first mentioned commutator bars with respect to the core slots from which emerge those leads with which the bars are connected.

Further objects and advantages of the present invention will be apparent from the following description, reference being had to the accompanying drawings wherein a preferred embodiment of the present invention is clearly shown.

In the drawings:

Fig. 2 is a side view of the machine.

Fig. 3 is a fragmentary front view on a larger scale than Fig. 1. The left half of Fig. 3 omits certain parts for sake of clearness and includes a sectional view on the line 3—3 of Fig. 4.

Fig. 4 is a fragmentary sectional view on line 4—4 of Fig. 3.

Fig. 5 is a fragmentary front elevation drawn to a larger scale than Fig. 3 showing the wire guides and staking blades fully retracted from the armature.

Fig. 6 is a sectional view on line 6—6 of Fig. 5.

Fig. 7 is a view similar to Fig. 5 showing the wire guides moved against the commutator while the staking blades remain retracted.

Fig. 8 is a sectional view on line 8—8 of Fig. 7.

Fig. 9 is a view similar to Figs. 5 and 7 showing the guides and stakers engaging the commutator.

Fig. 10 is a sectional view on line 10—10 of Fig. 9.

Fig. 10A is a sectional view on line 10A—10A of Fig. 9.

Fig. 11 is a fragmentary perspective view showing the relation of the guides and the stakers.

Figure 14:
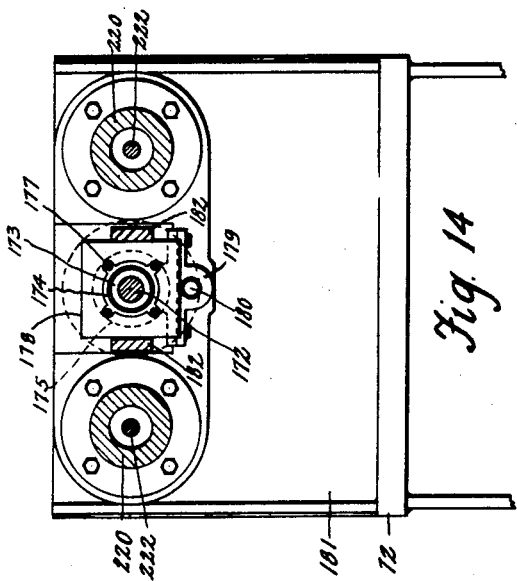
Figure 13:
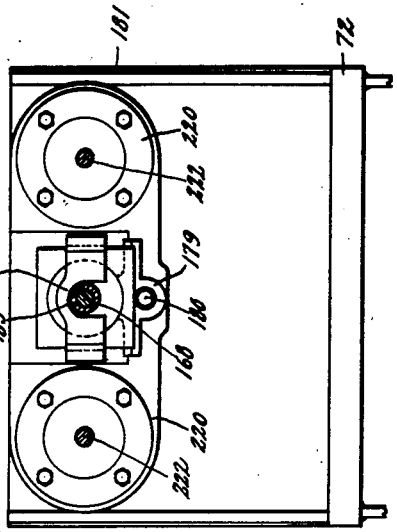
Figure 12:
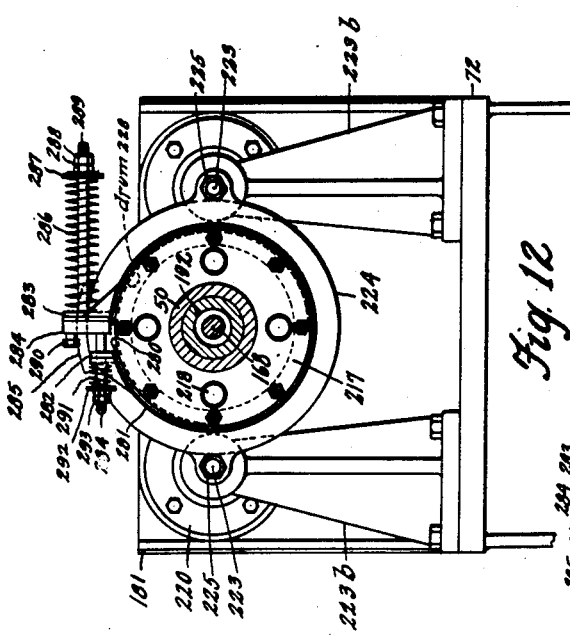

Figs. 12, 13 and 14 are sectional views on lines 12—12, 13—13, and 14—14 of Fig. 2.

Figure 12A:
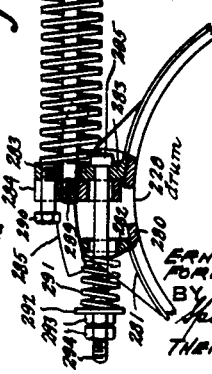

Fig. 12A is an enlargement of a portion of Fig. 12.

Figure 16:
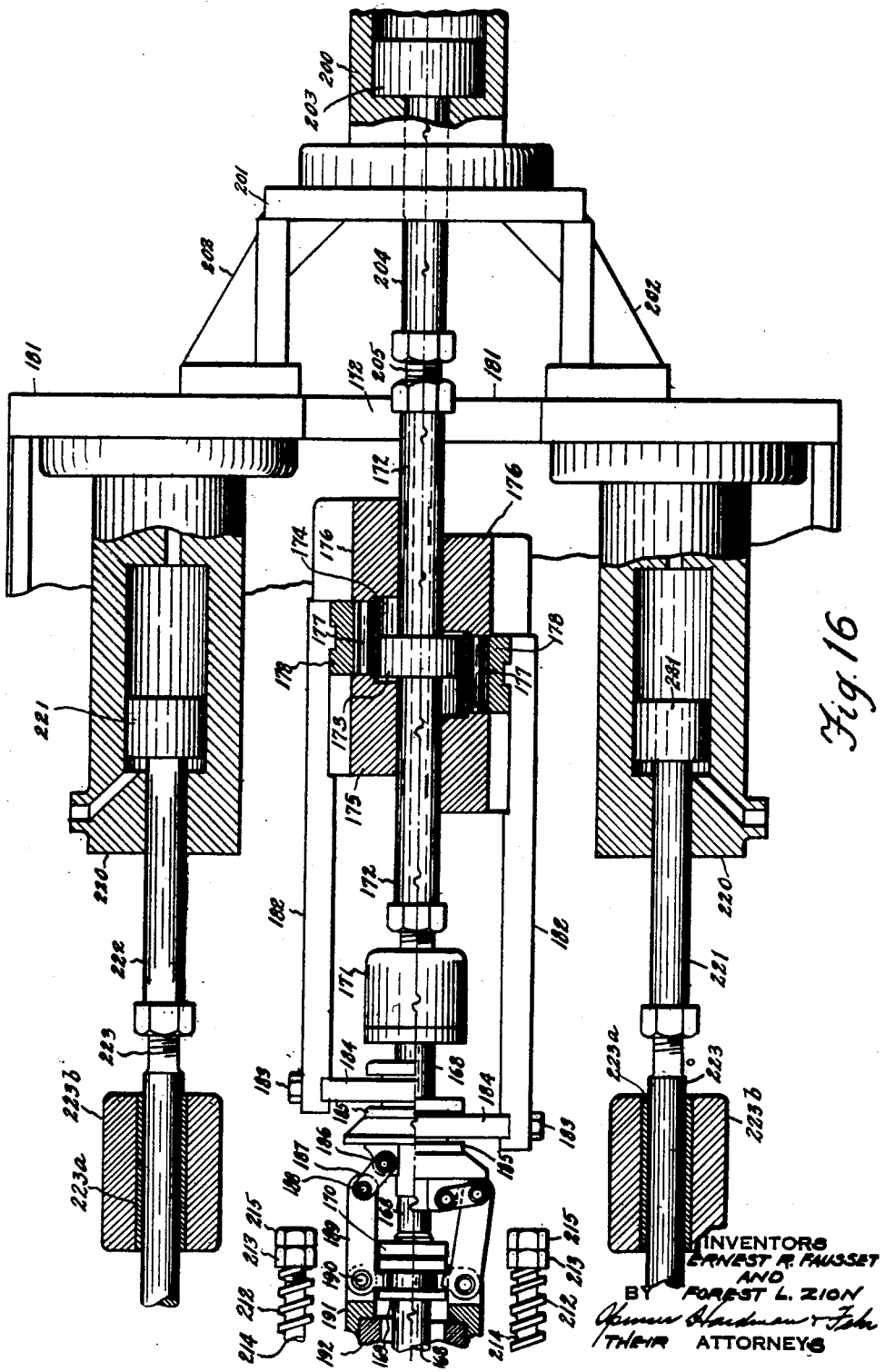

Figs. 15 and 16 comprise a longitudinal sectional view on line 15—15 of Fig. 2. The upper halves of these figures show the armature chuck and its operating means in non-gripping status. The lower halves of these figures show the gripping status.

Figure 17:
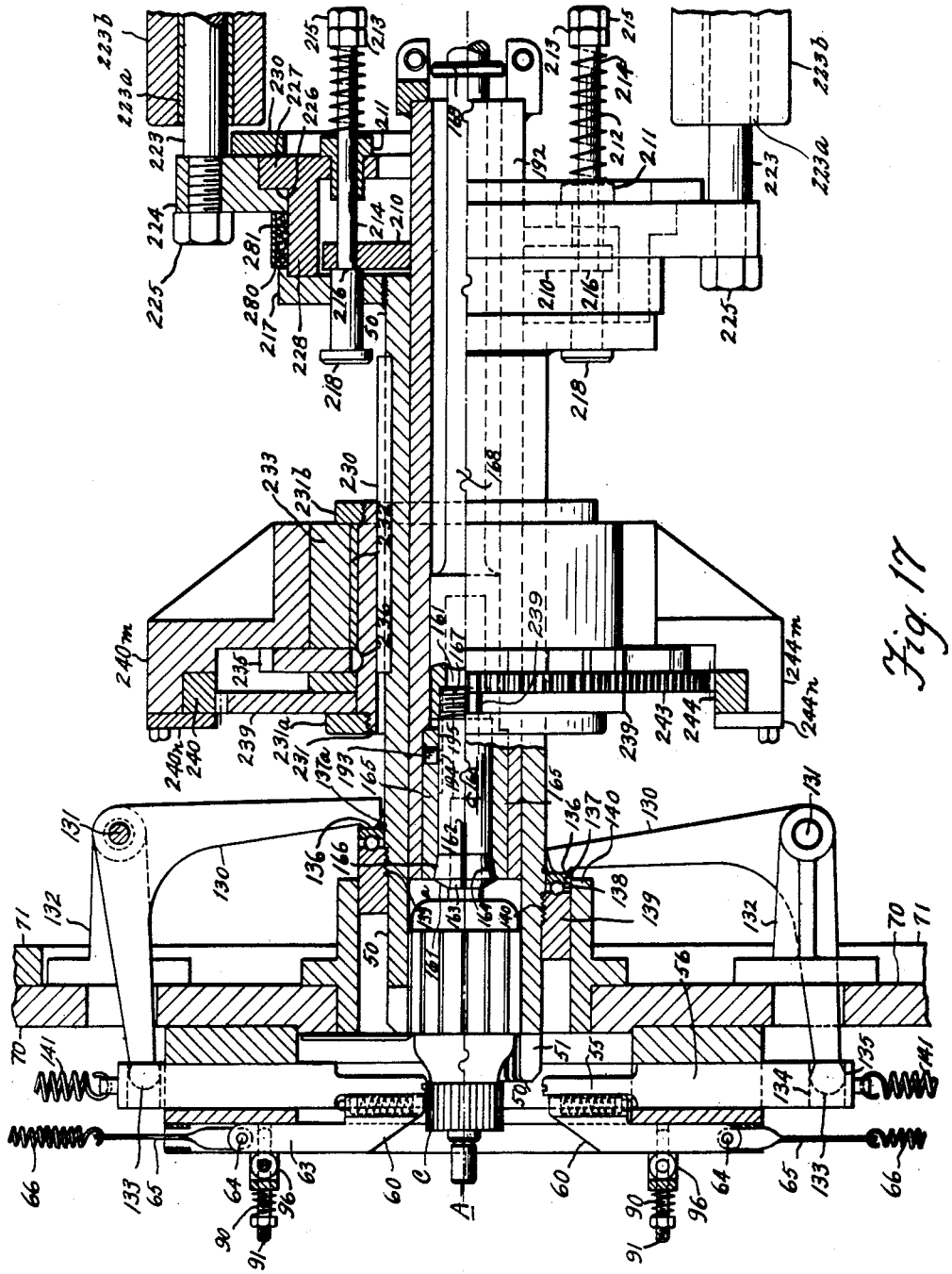
Figure 18:
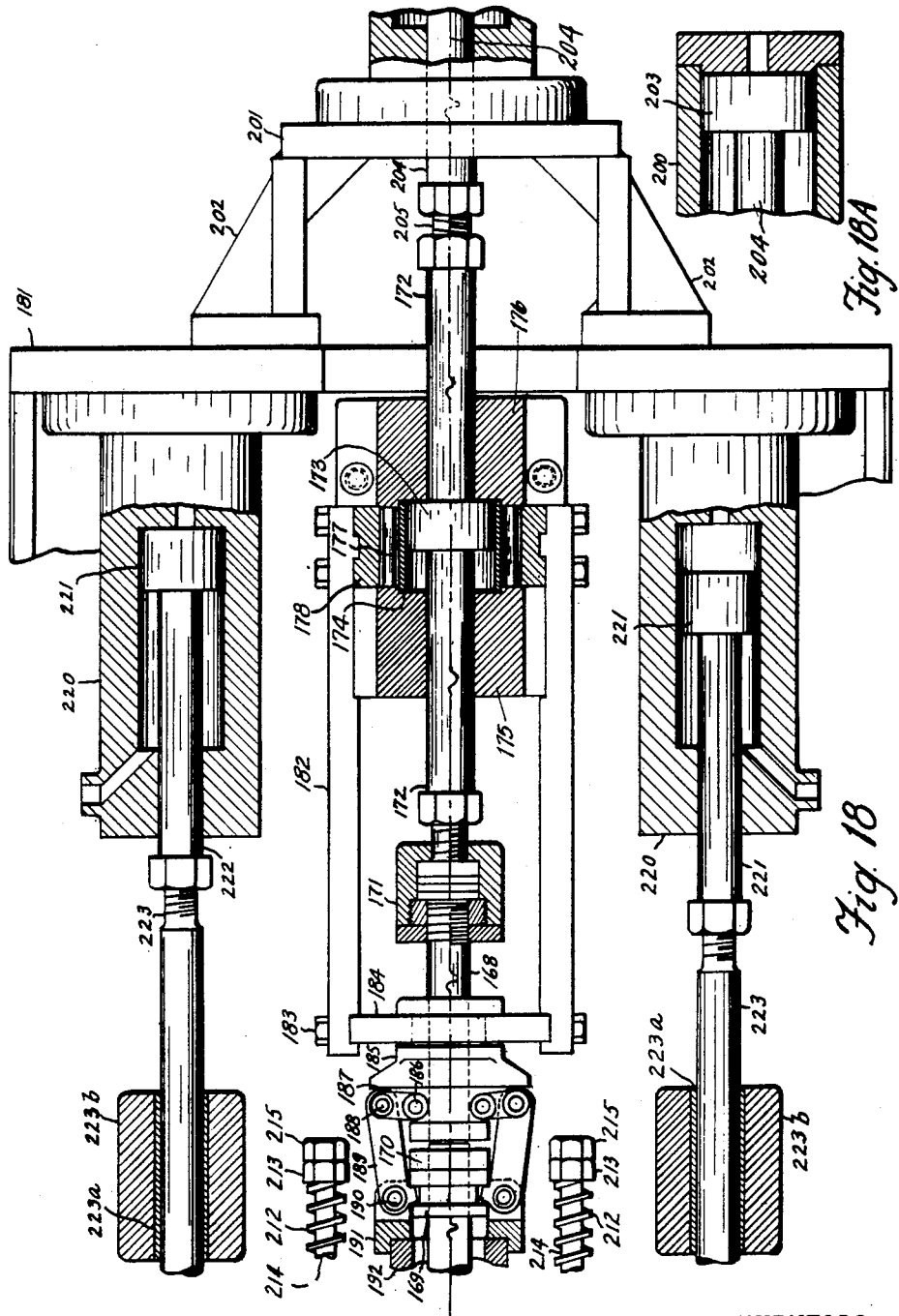

Figs. 17 and 18 are views similar to Figs. 15 and 16. The lower halves of these figures show the status of the machine just prior to staking. The upper halves of these figures show the staking status. Fig. 18A shows a part omitted from Fig. 18.

Figure 19:
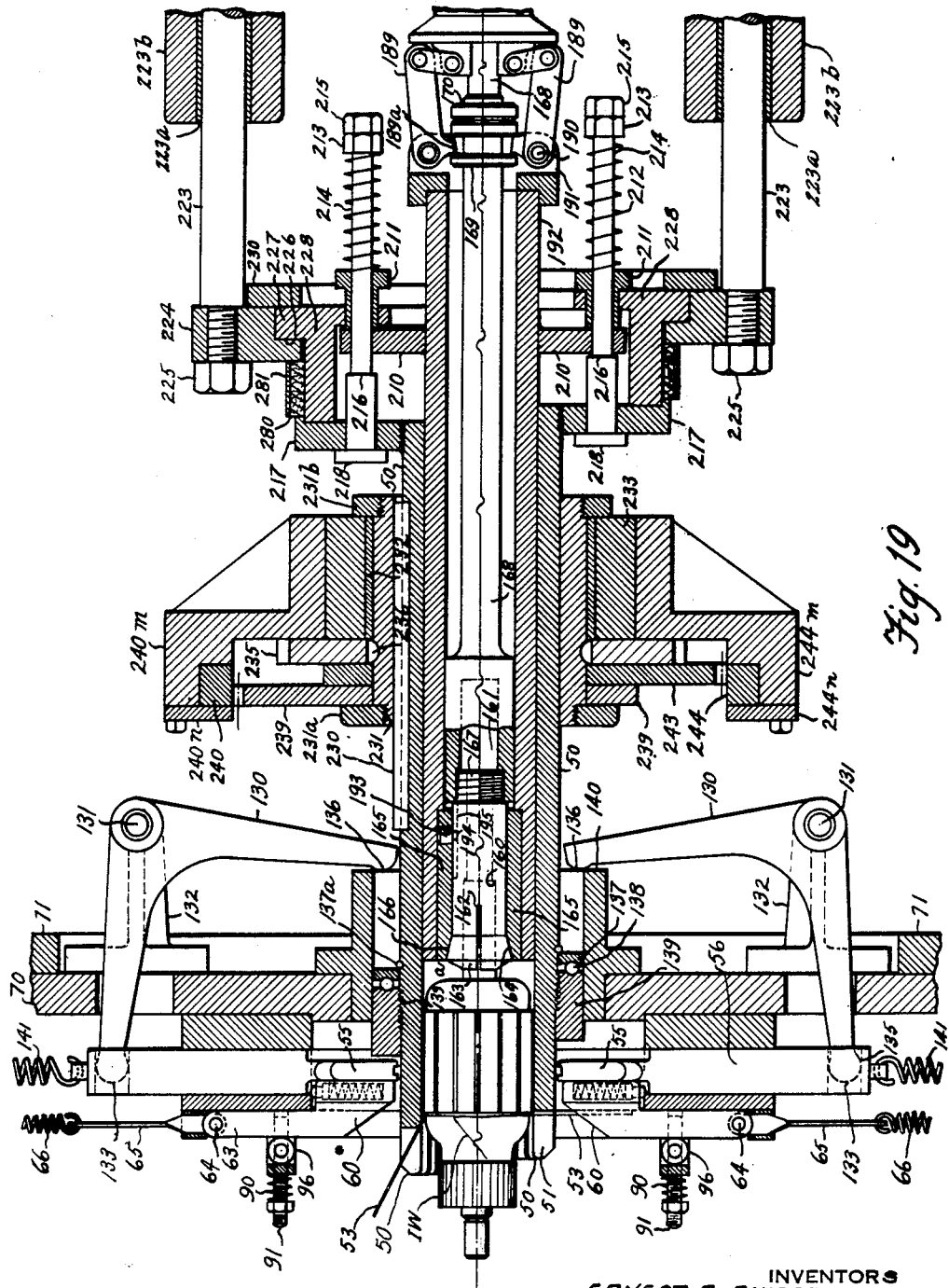
Figure 20:
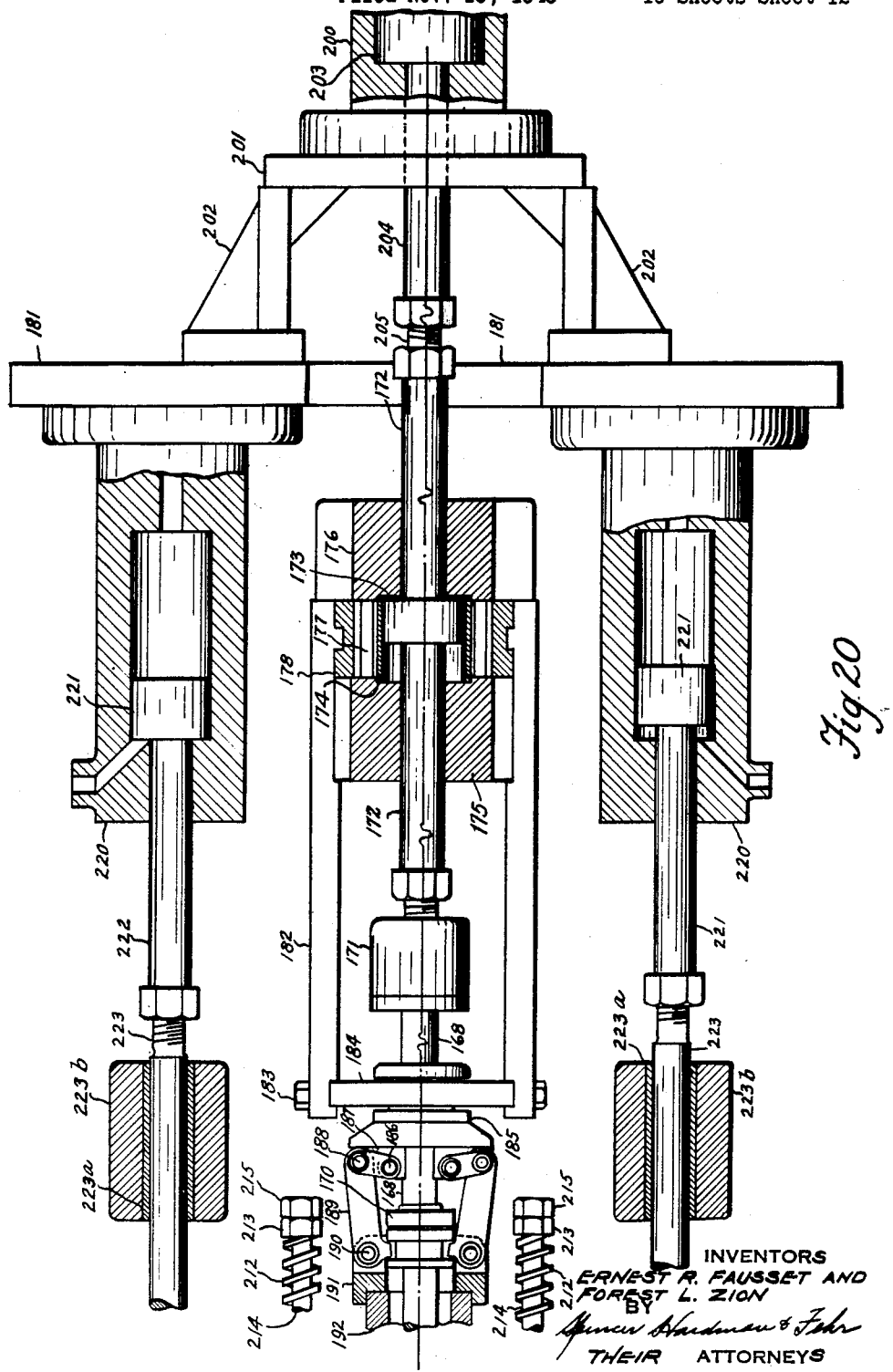

Figs. 19 and 20 are views similar to Figs. 15 and 16. The lower halves of these figures show the status following staking when the parts have returned to normal condition. The upper halves of these figures show the status after bending armature leads from positions at right angles to the armature axis into positions which are inclined to said axis.

Figure 23:
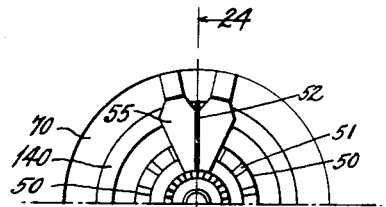
Figure 24:
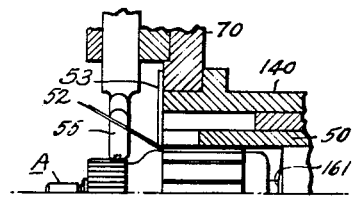
Figure 25:
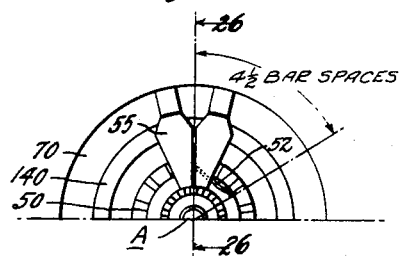
Figure 26:
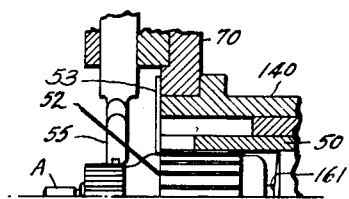
Figure 27:
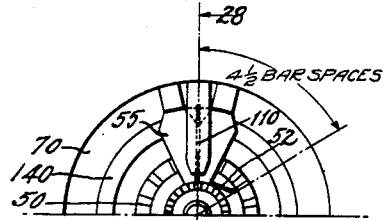
Figure 28:
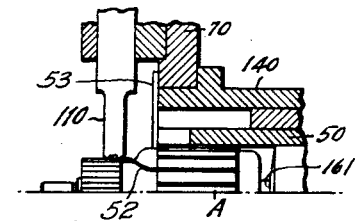

Figs. 21 through 30 are diagrams of the functions of the machine during the first cycle of its operation. Fig. 24 is a sectional view on line 24—24 of Fig. 23, Fig. 26 is a sectional view on line 26—26 of Fig. 25, Fig. 28 is a sectional view on line 28—28 of Fig. 27.

Figure 30:
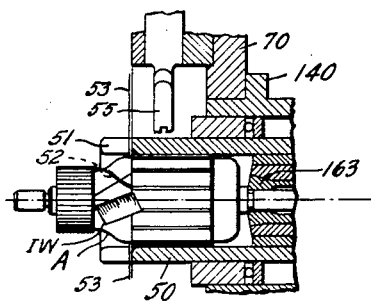
Figure 31:
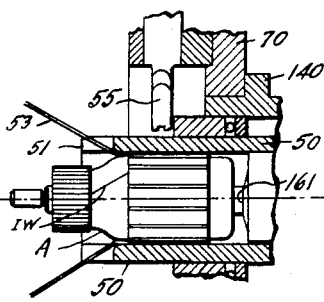
Figure 32:
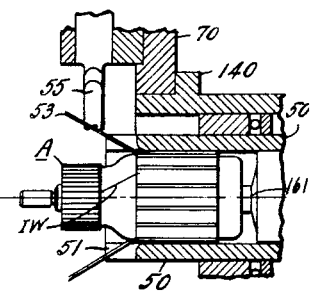
Figure 33:
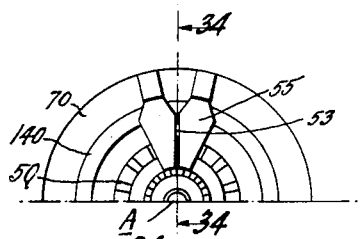
Figure 34:
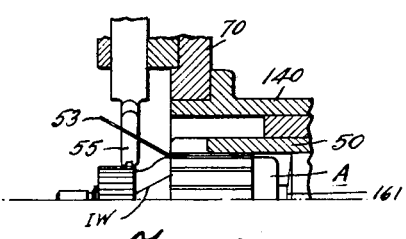
Figure 35:
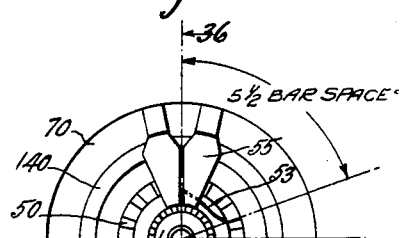
Figure 36:
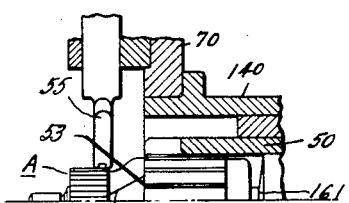
Figure 37:
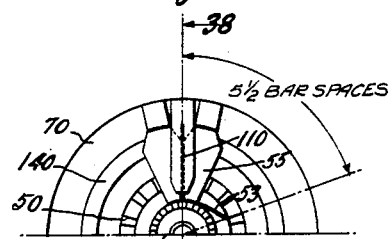
Figure 38:
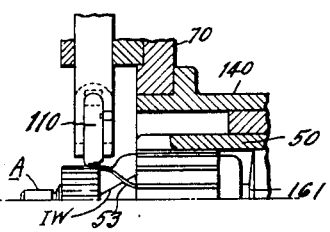

Figs. 31 through 39 are diagrams showing the functions of the machine during the second cycle of the machine. Figs. 30, 31 and 32 are sectional views similar to Figs. 21 and 22. Fig. 34 is a sectional view on line 34—34 of Fig. 33; Fig. 36 is a sectional view on line 36—36 of Fig. 35; Fig. 38 is a sectional view on line 38—38 of Fig. 37.

Figure 44:
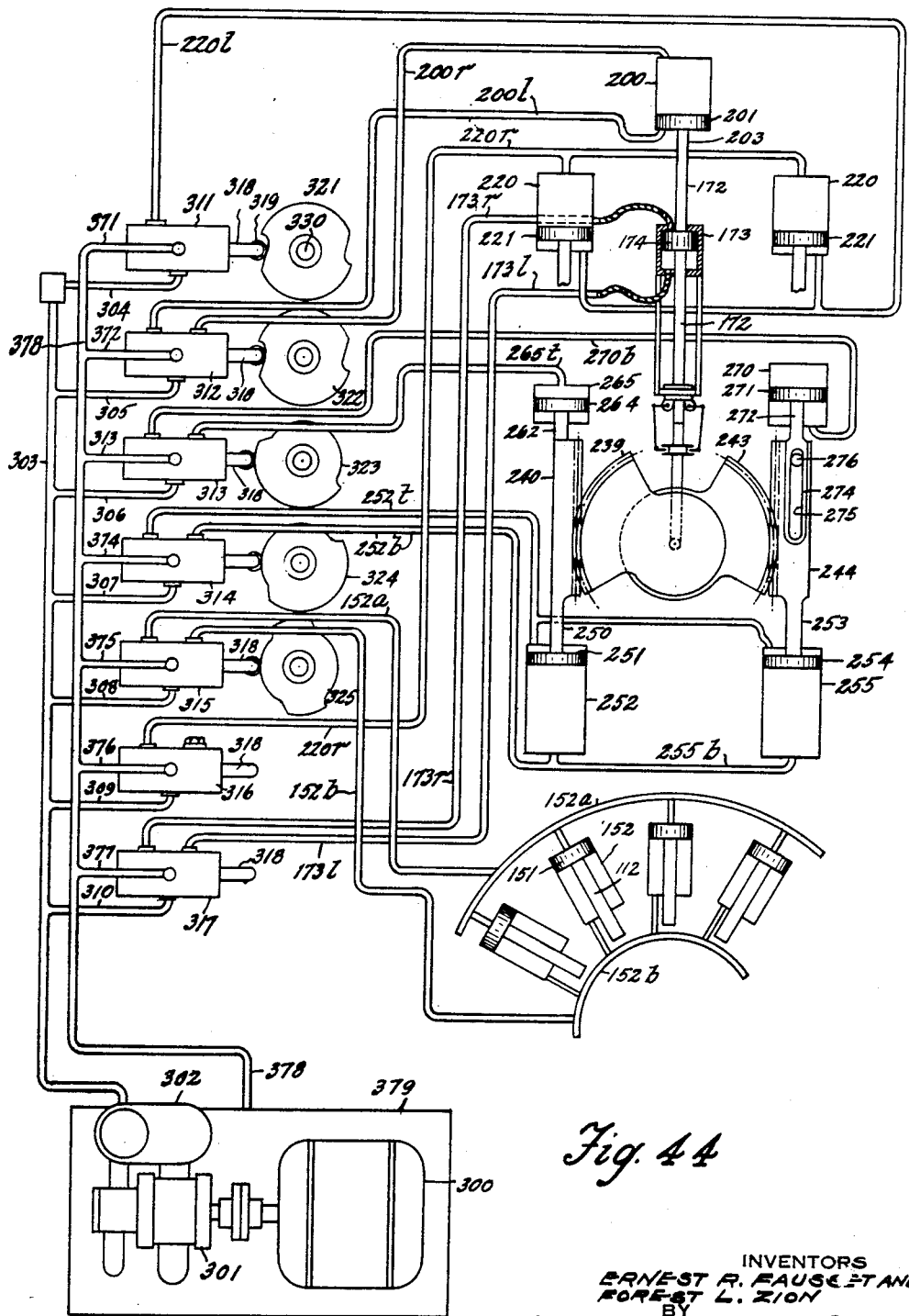
Figure 48:
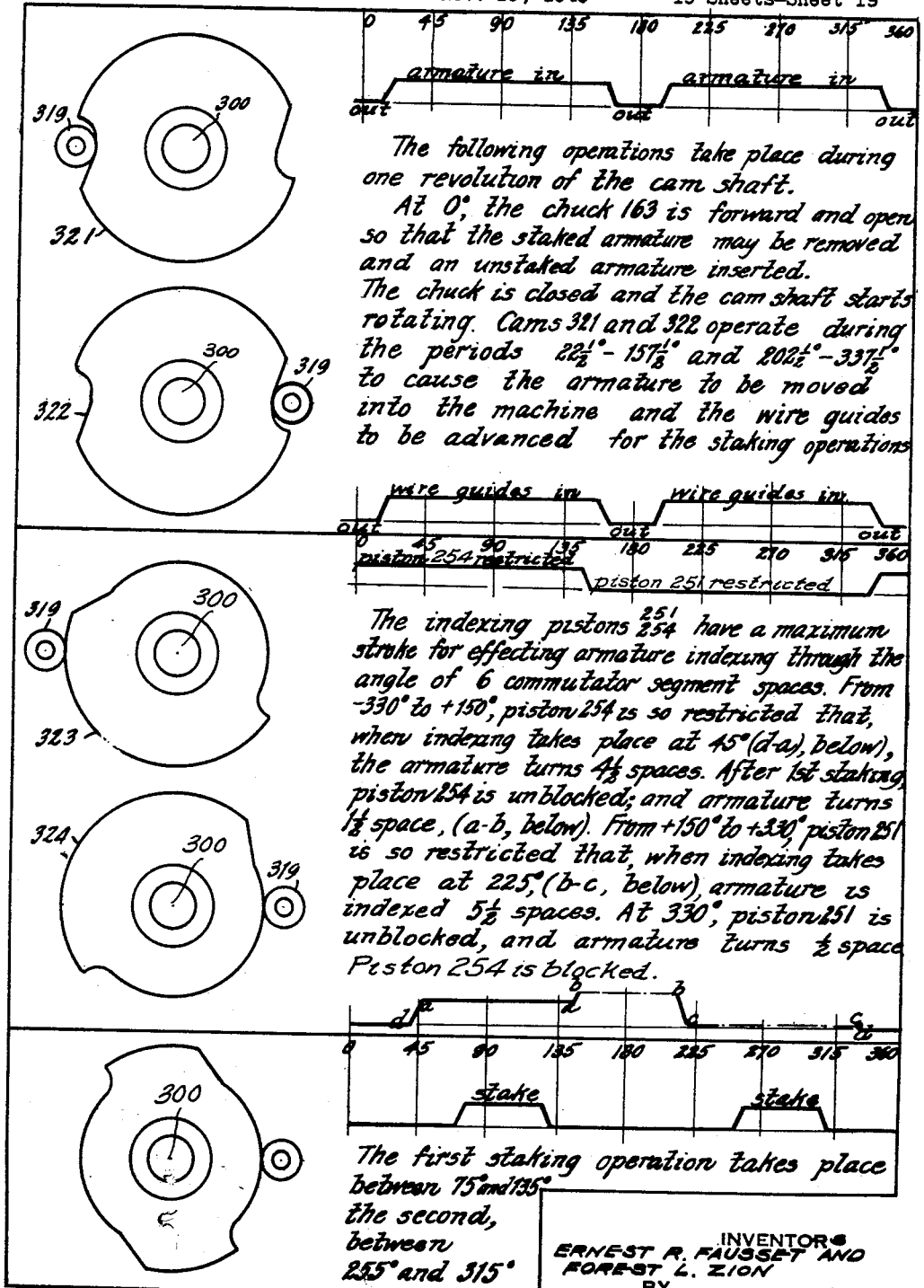

Figs. 40 and 41 taken together constitute a sectional view on line 40—40 of Fig. 2. Fig. 42 is a view in the direction of arrow 42 of Fig. 40. Fig. 43 is a view in the direction of arrow 43 of Fig. 41. Fig. 44 is a hydraulic diagram. Fig. 45 is a view taken on the line 45—45 of Fig. 2. Fig. 45A is a fragmentary, longitudinal, sectional view showing on an enlarged scale, certain parts shown in Fig. 45. Figs. 46 and 47 are fragmentary views taken respectively on lines 46—46 and 47—47 of Fig. 45. Fig. 48 is a chart showing the relative location of, and the function of the cams shown in Fig. 45.

Wire guides and staking blades

Figure 1:
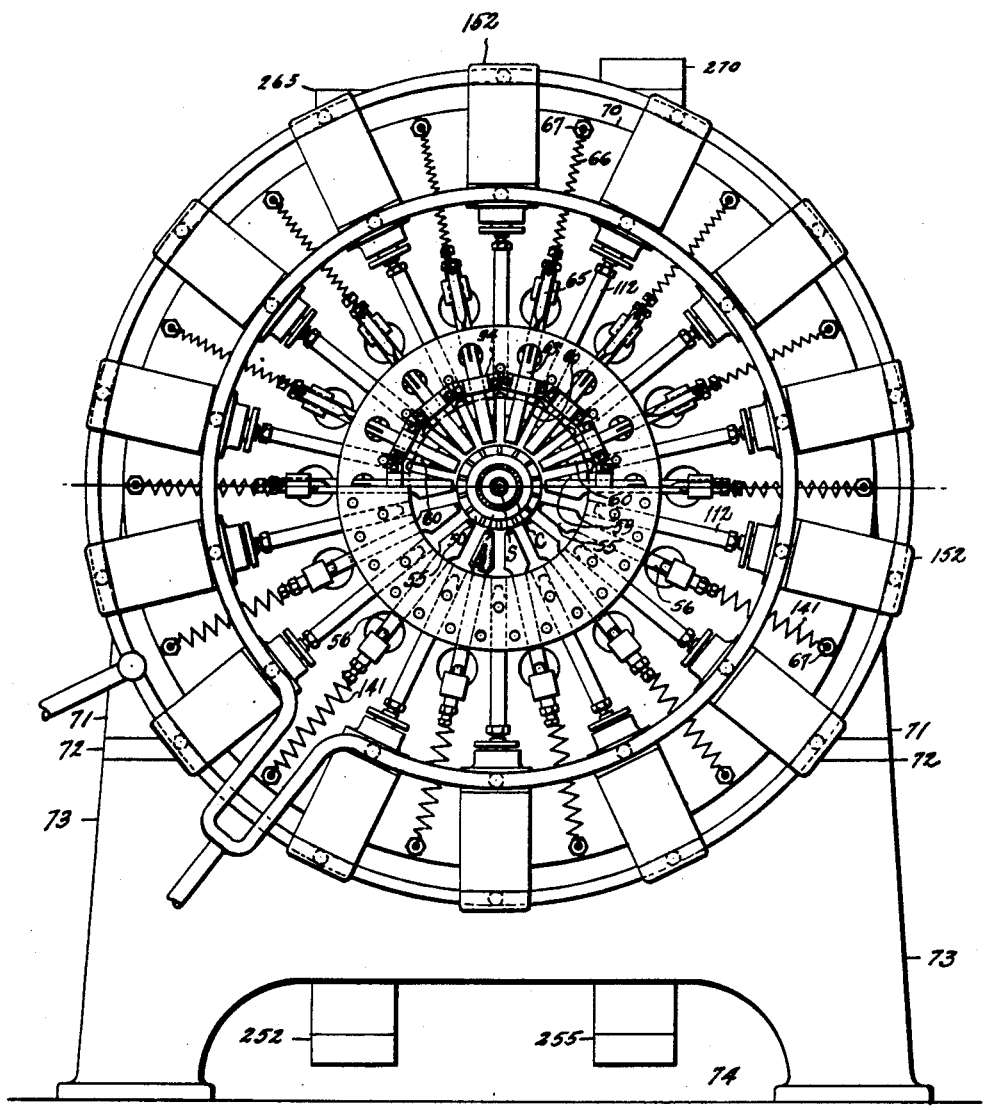
Fig. 1 is a front view of a machine embodying the present invention, said view being taken in the direction of the arrow 1 of Fig. 2. In the lower half of Fig. 1, certain parts have been omitted for sake of clearness.

In Figs. 1 and 2 the armature to be operated upon is designated A. It has a shaft S and a commutator C. The machine shown in the drawings operates upon an armature with 14 core slots each containing two active coil sides. There are 14 double wound coils making a total of 28 separate coils. The wires used in winding the double coils are covered with insulation having tracer threads of different colors, red and blue, for example, to make it possible to identify the different leads of the coil. As shown in Fig. 4 the armature A is placed within a tubular wire locator 50 and its shaft S is gripped by a chuck to be described. Locator 50 has 14 notches 51, each of which receives a red insulated lead 52 and a blue insulated lead 53 extending from the same core slot. The red insulated leads, for example, are located in inclined positions and the blue insulated leads 53 are located vertically. This disposition of leads is shown also in Figs. 5 and 6. Fig. 6 shows that the armature A and the locator 50 have been moved toward the right from the position shown in Fig. 4 in order to bring the incline leads 52 into position for the guidance of these leads into the notches of the proper commutator bars and for the entering or staking of the leads into the notches.

The lead wires are guided between adjacent surfaces 54 of wire guides 55 provided by sliding bars 56 as shown in Fig. 11. The guides 55 move from a full line position to the dot-dash line position 55' as shown in Fig. 11, or from position 55 shown in Fig. 6, to position 55' shown in Fig. 8, while the lead positioner 50 moves from the position shown in Fig. 6, to 50' shown in Fig. 8. Fig. 8 shows that the lower edge of the guide 55 comes in very close proximity to the commutator C. The guide 55 is provided with a notch 57 which provides clearance for the rough ends of a coil lead l previously staked into the commutator bar notch. During the movement of the guides 55 toward the commutator, auxiliary wire guides 60 move from the position shown in Figs. 5 and 8 to the position 60' shown in Figs. 7 and 8. Each of the guides 60 overlies a guide 55 in either of its operating positions as shown in Figs. 5 and 7. Each auxiliary guide 60 has a surface 61 in contact with a guide 55, said surface 61 being keystone in shape in conformity with the similar shape of the guide 55. The wire engaging surfaces 62 of guide 60 are rounded as shown in Fig. 6A. Each guide 60 is integral with an arm 63 connected by pin 64 with a bar 65 urged outwardly by a spring 66 (Figs. 4 and 1) attached to a stud 67 carried by a mounting plate 70, which is secured by a bracket 71 to a table 72 having legs 73 for supporting the table above the floor indicated at 74. To the plate 70 is secured an annular block or ring 75 having grooves 76 each for receiving a guide bar 56. The bars 56 are retained by an annular plate or ring 77 to which is attached an annular plate 78 the inner edge 79 of which is interrupted by notches 80 for receiving the leads 52 or 53. Said inner edge 79 is interrupted also by notches 80a merging with holes 81 and with recesses 82 which are wider than the length of the pins 64.

Each bar 63 (Figs. 6 and 8) is urged toward the plate 77 by a pair of springs 90. Each spring 90 surrounds a stud 91 attached to the plate 78 and is confined between a nut 92 (threaded on stud 91) and an ear 93 of a U-shaped bracket 94 carrying a cross-pin 95 upon which a roller 96 is journaled, said roller transmitting the pressure of the springs 90 to the arm 63. Therefore each arm 63 is urged into the position shown in Fig. 6 by the springs 90 pushing toward the right and by a spring 66 urging the arm upwardly. Upward movement of the arm 63 is limited by its striking the part 78a of the plate 78. When the arm 63 is located as shown in Fig. 6, a plunger 100 carried by guide 60 is located in close proximity to the lower edge 77a of the plate 77. The plunger 100 is received by a recess 101 in guide 60, said recess receiving a spring 102 confined between a plug 103 and the flange 100a of the plunger 100. The flange 100a limits upward movement of the plunger 100 by engaging a shoulder 100b of the recess 101.

When the guide bars 56 move downwardly to carry the guides 55 into the positions 55' (Fig. 11), surfaces 56a of the bars 56 engage the plungers 100 to cause guides 60 to move from the positions shown in Fig. 6 to that shown in Fig. 8. After the guides 55 and 60 have been so moved, the armature A is indexed by means to be described in order angularly to displace those core slots, from which the leads 52 emerge, with respect to those commutator bars whose notches, respectively, are to receive the leads 52. During this indexing operation each lead 52 is confined within the narrow space between the closely adjacent guides 55 (in the positions 55') and between the closely positioned guides 60 (in the positions 60'). During the indexing operation, the leads 52 are pulled between the guides 55 and 60 while these leads are being drawn from closer to the armature shaft. During this motion thereof, each lead 52 is ironed out between the rounded surfaces 62 of the adjacent guides 60 thereby removing any kinks in the wire. As shown in Fig. 8, the outer leads (such as 52) are located outwardly from the inner leads (such as l) previously connected with commutator bars. During this indexing of the armature in order to skew the outer leads, they are skewed under tension due to frictional resistance provided by contact with surfaces of the guides 55 and 60 which, when advanced toward the commutator, provide narrow radial slots closely confining the leads. The skewing of the leads causes them to be pulled inwardly against the previously connected inner leads. This is indicated by the position of lead 52 in Fig. 10. The leads 52 are now ready to be staked into the notches of the commutator bar by means of staking blades 110 shown in Fig. 11. Each blade 110 is received by grooved recesses 111 of a bar 112. The bar 112 is provided on opposite faces thereof with notches 113 to provide clearance for the guides 55. After the guides 55 have been moved to positions 55', the bars 112 move inwardly toward the commutator to cause the blades 110 to move between the narrow spaces between the guides at 55' in order to move the leads 52 inwardly toward the commutator. Each blade 110 has a portion 115 which engages a lead to push it in to the commutator bar notch indicated at bn Fig. 11 and to push those portions of the leads which are adjacent the commutator against the previously connected inner leads l as indicated in Fig. 10A. Each blade 110 is provided with a cutter 116 for severing the excess of wire projecting beyond the notch bn. Before a lead is actually pushed into a bar notch bn, the guides 60 are caused to be automatically moved outwardly toward the position shown in Fig. 10 and then to move into the position shown in Fig. 10A in which latter position they are entirely out of contact with the leads so that after the lead ends are cut off they may freely descend to a scrap metal container. The automatic retraction of the guides 60 is effected in the following manner. As the bars 112 move downwardly from the position shown in Fig. 8 they come into a position 112a in Fig. 10, wherein they engage inclined surfaces 120 provided by the guide 60 (Fig. 8) and move these surfaces from the position 120a Fig. 10 to the position 120b thereby moving the guide 60 from position 60', Fig. 8, to the position 60'', Fig. 10. When this occurs the springs 66 operate to pull the guides 60 to the position 60''' in Fig. 10A in which positions the guides 60 are entirely clear of the leads which are staked and cut as shown in Fig. 10A. After the wire staking and severing operations, the staking blades and their supporting bars 112, the guides 55 and their supporting bars 56 return to the outer positions shown in Figs. 5, 6 and 11 and the springs 90 operate to return the guides 60 to the position shown in Fig. 6.

The bars 56 providing the guides 55 are advanced toward and retracted from the commutator by bell crank levers 130 each pivoted on a pin 131 carried by a bracket 132 attached to the plate 70. One arm of the lever 130 has a rounded end 133 received by a recess in the bar 56 said recess being bounded by surfaces 134 and 135. The other end of the bell crank 130 has a rounded portion 136 for engagement with the outer race 137 of a thrust bearing 138, the inner race of which is provided by sleeve 139 threaded at 139a upon the wire locator 50. Outer race 137 is retained by a snap-ring 137a upon the locator 50. Sleeve 139 is slidably supported by a tubular bearing 140 attached to plate 70. Each bar 56 is urged outwardly by a spring 141 attached to a stud 67 as shown in the lower part of Fig. 1. Therefore as the locator 50 moves from the position shown in the upward part of Fig. 17 to that shown in the lower part of Fig. 17, the springs 141 retract the bars 56 while causing the bell crank lever portion 136 to follow the thrust bearing 138. Conversely when the locator 50 moves from the position shown in the lower part of Fig. 17 to the upper part of Fig. 17 the bell crank levers are caused to move the bars 56 toward the commutator C as shown in the upper half of Fig. 17.

The blade carrying bars 112 are each connected to a piston rod 150 attached to a piston 151 (Fig. 3) operating in a hydraulic cylinder 152, each connected by screws 153 with the plate 70. When pressure fluid is admitted to the outer ends of cylinders 52 and the inner ends of these cylinders are connected with drain, the bars 112 move toward the commutator; and the bars 112 move outwardly when fluid pressure is admitted to the inner ends of the cylinders and the outer ends of these cylinders are connected with drain or low pressure line.

*Armature shaft chuck*

As shown in Fig. 15 the armature shaft S is received by the recess 160 of a collet chuck 161 divided by sawcuts 162 to provide a plurality of resilient armature shaft engaging members 163 which are conically tapered at 164 to be engaged by a sleeve 165 having a correspondingly tapered surface 166. The members 163 of the collet chuck are caused to grip the armature shaft S by effecting relative movement between the chuck element 63 and the sleeve 165. This relative movement is effected in the following manner. The chuck member 161 threadedly connected at 167 with a rod 168 which is screw threadedly engaged by a grooved collar 169 retained in adjusted position by lock nut 170. The rod 168 extends to the right of nut 170 and is connected by a coupling 171 with a rod 172 in alignment therewith said coupling preventing appreciable axial movement between the rods 168 and 172 while permitting the rod 168 to rotate relative to the rod 172 when the armature is indexed. Rod 172 is connected to a piston 173 received by a cylinder 174 having ends 175 and 176 secured by bolts 177 to a block 178 attached to a bracket 179 which slides on a horizontal rod 180 attached to a supporting plate 181. The block 178 is connected by bars 182 and screws 183 with a yoke 184 which is received by a grooved collar 185 slidable along a rod 168. Collar 185 is connected by pins 186 with links 187 connected by pins 188 with links 189 connected by pins 190 with notched ears 191 welded to sleeve 192 which carries the sleeve 165. Sleeve 165 carries a pin 193 having a portion 194 of reduced diameter for engaging a longitudinal groove 195 in the collet member 161.

The upper half portions of Figs. 15 and 16 show the armature shaft released from the chuck. To cause the chuck to grip the armature shaft, pressure fluid is admitted to the left end of the cylinder 173 thereby causing it to move from the position shown in the upper half of Fig. 16 to the position shown in the lower half of Fig. 16. Therefore, bars 182 move from the position shown in the upper half of Fig. 16 to that shown in the lower half thereby causing the links 189 to move from the positions shown in the upper half of Figs. 15 and 16 to the position shown in the lower half. During this movement of the links 189, their lugs 189a thereof are caused to bear against the right-hand flange of the collar 169 thereby causing the pins 190 to be urged toward the left and likewise the sleeve 192 toward the left so that the sleeve 165 moves from the position shown in the upper half of Fig. 15 to that shown in the lower half of Fig. 15. Thereby, it is apparent that the relative movement between the clamping sleeve 165 and the collet chuck 161 is effected as the result of axial movement of the sleeve 192 to the left relative to the rod 168. The chucking and unchucking of the armature shaft is effected while the armature is in the loading and unloading position shown in Fig. 15, the chuck 161 and the locator 50 being positioned as in Fig. 15. After the armature shaft has been gripped by the chuck, the armature and the locator 50 will move together to the position shown in Fig. 17.

*Mechanism for moving the armature from its loading position to the position for operation by the lead staking mechanism*

The mechanism for moving the armature from the loading position shown in Fig. 15 to the position for operation shown by the lead staking mechanism in Fig. 17 includes means which bodily moves the chuck members 161 and 165 longitudinally. This means includes an hydraulic cylinder 200 (Fig. 16) mounted on a plate 201 attached by brackets 202 to the plate 181. The cylinder 200 receives a piston 203 connected with a piston rod 204 connected adjustably by screw threaded element 205 with the rod 172. When the pressure fluid is admitted to the left end of cylinder 200 the piston 203 moves from the position shown in Fig. 16 to that shown in Fig. 18A thereby causing the cylinder 173 together with its cooperating piston 174 to move as a unit from the position shown in Fig. 16 to that shown in Fig. 18. Therefore, the chuck elements will move as a unit while they retain their grip upon the armature shaft thereby moving the armature from the position shown in Fig. 15 to that shown in Fig. 17. During this movement a plate 210 welded to the sleeve 192 moves from the position shown in Fig. 15 to the position shown in Fig. 17. During this movement of the plate 210, it pushes on two bushings 211 and causes them to push against springs 212 confined between the bushings 211 and nuts 213 threadedly engaging rods 214 and retained thereon in the desired position of adjustment by lock nuts 215. The springs 212 in turn tend to urge the bushings 211 toward the left and the plate 210 against shoulder 216 provided by rods 214. Rods 214 pass through a plate 217 welded to the wire locator sleeve 50. The rods 214 have heads 218 bearing against the left hand surfaces of the plate 217. Therefore, during movement of the piston 203 toward the right into the position shown in Fig. 18A the motion thereof is transmitted to the spring 212 to the rods 214 and through the plate 217 through the lead locator 50 to cause it to move with the armature to the position shown in the lower half of Fig. 17.

*Apparatus for effecting movement of the lead locator sleeve 50 relative to the armature*

After the armature has been located as shown in Fig. 17 it is necessary to move the lead locator 50 from the position shown in the lower half of Fig. 17 to that shown in the upper half before the staking of the leads can be effected. In order to accomplish this, two hydraulic cylinders 220 are secured to the mounting plate 181. The cylinders 220 cooperate with pistons 221 having piston rods 222 threadedly connected adjustably by rods 223 sliding in bushings 224 supported by brackets 225 which rest on the table 72. As shown in Fig. 15, the rods 223 threadedly engage plate 224 and are also secured by nuts 225. The plate 224 is counterbored at 226 to receive the flange 227 of a drum 228 attached by screws 229 to the plate 217. The flange 227 is secured within the recess provided by the counterbore 226 by a retainer ring 230 attached to the plate 224. It is therefore apparent that when pressure fluid is being admitted to the left end of the cylinders 220 the pistons 221 will move toward the right from the position shown in the lower half of Fig. 18 to the position shown in the upper half thereof. Therefore, the locator 50 will be moved from the position shown in the lower half of Fig. 17 to that position shown in the upper half of Fig. 17. It will be explained in detail later that pistons 221 and 203 move to the right substantially concurrently, piston 221 arriving at the position shown in Fig. 18, lower, by the time piston 203 has arrived at the position shown in Fig. 18A. Therefore the armature A and the locator 50 move as a unit from the position shown in Fig. 15, lower, to the position shown in Fig. 18, lower. Pressure fluid in the left ends of cylinders 220 causes the pistons 221 to move from the positions shown in Fig. 18, lower, to the positions shown in Fig. 18, upper, thereby causing movement of sleeve 50 from the position shown in Fig. 17, lower, to that shown in Fig. 17, upper. When the sleeve 50 so moves, the wire guides 55 and 60 move down into the operating position shown in Figs. 7 and 8. This is followed by the indexing of the armature in the manner to be described later. For the present it is sufficient to state that the armature is rotated sufficiently to move its core slots an angular distance equal to the angular displacement required by the active coil sides of the commutator bars. After the indexing of the armature takes place the pressure fluid is admitted to the outer ends of the cylinders 152, Figs. 1 and 4, to cause the blades 110 to advance against the leads and push them into lead receiving notches of the commutator bars and to cut off the excess wire. The pressure fluid is admitted into the inner ends of the cylinders 152 to cause the blades to be retracted. After the staking operation the pressure at the left ends of the cylinders 220 is relieved and these ends are connected with the drain and the force of the springs 212 (compressed beyond their initial state of compression as shown in Fig. 17, upper) causes the pistons 221 to move from the position shown in Fig. 18, upper, to the position shown in Fig. 18, lower. Then pressure fluid is admitted to the right end of cylinder 200 while its left end is connected with drain thereby causing the piston 203 to move from the position shown in Fig. 18A to the position shown in Fig. 20 which is the same as the position shown in Fig. 16. This causes the armature and the lead locator 50 to move to the position shown in the lower half of Fig. 19 which is the same as the position shown in Fig. 15. The armature is now in a position to have a wrapping of insulation IW applied around the leads 52 which have been connected with alternate commutator bars.

*Means for fanning out the remaining leads*

Before starting the second cycle of operation of the machine upon the leads 53, it is necessary to push them from the vertical positions shown in Fig. 6 into the inclined position similar to the positions of leads 52 shown in Fig. 6. This is effected by causing movement of the wire locator 50 toward the left relative to the armature while the armature remains in the position shown in Fig. 19. For this movement pressure fluid is admitted to the right ends of the cylinders 220 at the time their pistons 221 are initially in the position shown in Fig. 20, lower. This causes the pistons 221 to move from the position shown in Fig. 20, lower, to the position shown in Fig. 20, upper. This motion of the piston is transmitted by the rods 222 and 223 to the plate 224 and thence through the drum 228 to the plate 217 and thence to the sleeve 50 to cause the sleeve 50 to move from the position shown in the lower half of Fig. 19 to that shown in the upper half thereby causing the leads 53 to move from the vertical position shown in the lower half of Fig. 19 to the inclined position shown in the upper half. After this takes place, the right ends of the pistons 220 are connected with drain and the springs 212 which were compressed beyond their normal status, as shown in the upper half of Fig. 19, are permitted to expand to the normal status thereby causing the lead locator sleeve 50 and the pistons 221 to return to the position shown in Figs. 19 and 20, lower.

*Armature indexing mechanism*

The armature is indexed by rotating the chuck. This is accomplished by rotating the lead locating sleeve 50 connected with the chuck through the plate 217, the rods 214, the plate 210 and the sleeve 192 which not only grips the collet chuck 161 but is also connected therewith through the pin 193 attached to the sleeve 165 which engages the groove 195 provided by the collet chuck 161.

The sleeve 50, which must be longitudinally slidable as well as axially movable, is connected by sliding key 230 with a tubular shaft 231 rotatable within a bearing liner 232, carried by a bearing bracket 233, supported by a table 72 (Fig. 41). To the shaft 231 a ratchet 235 is connected by key 236. Ratchet 235 is driven clockwise either by a pawl 237 pivoted upon a pin 238 attached to gear segment 239 meshing with a rack 240 or by a pawl 241 pivoted upon a pin 242 carried by gear segment 243 meshing with a rack 244. Racks 240 and 244 are guided by brackets 240m and 244m, respectively, attached to bracket 233 and are retained thereon by plates 240n and 244n, respectively. A leaf spring 237a carried by the gear segment 239 urges the pawl 237 against the ratchet 235. A leaf spring 241a carried by the gear segment 243 urges the pawl 241 against the ratchet 235. The rack 240 is connected with a piston rod 250 which, as indicated diagrammatically in Fig. 44, is attached to a piston 251 cooperating with a cylinder 252. Rack 244 is connected with a piston rod 253 attached as shown diagrammatically in Fig. 44 to a piston 254 cooperating with a cylinder 255. When pressure fluid is admitted simultaneously to the lower ends of the cylinders 252 and 255, the racks 240 and 244 are urged upwardly from the positions shown in Fig. 41 toward the positions shown, respectively, in dot-dash lines 240a and 244a in Fig. 40. Upward movement of the rack 240 causes movement of the gear segment 239 counter-clockwise into the position 239a in Fig. 40 and upward movement of the rack 244 causes the gear segment 243 to move into the position 243a. The ratchet 235 is driven clockwise by this movement of the gear segment 239 while the counter-clockwise movement of the gear segment 243 simply backs its pawl 241 along the ratchet without driving it. The full travel of the piston 251 upwardly will cause rotation of the armature an angular distance equivalent to the spacing of three armature core slots or six commutator bars.

During the indexing operation effected by upward movement of piston 251, the required rotation of the armature is an angular distance equivalent to the spacing of 5½ commutator bars for a reason that will be more apparent later. In order to stop rotation of the armature before the end of the upward stroke of piston 251, there is provided an hydraulically operated stop in the form of a head 260 of a screw 261 attached to a piston rod 262 and secured thereto in the desired position of adjustment by a lock nut 263. Rod 262 is attached as indicated with a cylinder 265. When pressure fluid is admitted to the upper end of cylinder 265, the screw head 260 is located at 260a. Therefore, the upper end head portion 240h of the rack 240 can move only to the elevation m (Fig. 40) since the head 240h will strike the screw head at position 260a. Thus, the screw head 260, when in its lower position 260a, will limit the indexing of the armature to an angular distance equivalent to 5½ spaces. Following this indexing operation, staking of the leads takes place and then the wire guides and staking blades are retracted. Before another indexing operation takes place, the pressure fluid at the upper end of cylinder 265 is released so that the rack 240 can travel upwardly its full stroke under the effect of pressure fluid at the lower end of cylinder 252, whereupon the rack 250 moves to the elevation (Fig. 40). The movement from m to n causes the indexing of the armature an angular distance equivalent to ½ a commutator bar space. Thus the armature is located properly with respect to the lead locator 50 prior to the next indexing operation.

Another armature indexing operation is effected by downward movement of rack 244 when pressure fluid is admitted to the upper ends of cylinders 252 and 255. Rack 240 moves downwardly without effecting any rotation of the ratchet 235; and, while rack 244 moves downwardly, it causes its pawl 241 to drive the ratchet 235. The full downward stroke of the piston 254 within the cylinder 255 is sufficient to cause an indexing of the armature equivalent of three armature slot spaces or six commutator bar spaces. However, since it is desired to index the armature only 4½ commutator bar spaces, for reasons to be made clear, a hydraulic stop is provided for temporarily limiting the downward movement of the rack 244. This hydraulic stop is provided by cylinder 270 cooperating with a piston 271 connected by rod 272 with a pin 273 with a bar 274 having a long slot 275 for receiving a pin 276 carried by the rack 244, the rack being in its lowermost position as shown in Fig. 40. During upward movement of the rack 244, this movement is unrestrained therefore it can make its full travel and carry the pin 276 into the position 276x and therefore will cause the slotted bar to move upwardly into the position 274x. If there were no pressure fluid at the lower end of cylinder 270, when pressure fluid is admitted to the upper end of cylinder 255 the rack 244 would simply return to its lower position from the upper position 244a and the bar 274 would return to its lower position shown in full lines from its upper position 274x shown in dot-dash lines. The downward movement of the rack 244 can be limited by introducing pressure fluid into the lower end of the cylinder 270 before pressure fluid is admitted to the upper end of the cylinder 255. When this occurs, the slotted bar will be held in the position 274x. Therefore, the pin 276 cannot move from the position 276x clear down to the position 276 because it will be caught by the lower end of the bar slot 275 which is then at 275x. The pin 276 moves from level p to level q, which is the distance through which the rack 244 moves in order to index the armature an angular distance equal to the angular spacing of 4½ commutator bars. Before another indexing operation can be performed, and after a staking operation has been performed and the wire guides and staking blades have been retracted, pressure fluid at the lower end of the cylinder 270 is released so that the rack 244 may continue its downward movement a distance equal to the distance between levels q and r and complete the indexing of the armature an angular distance equal to six commutator bar spaces.

The machine is so controlled that the first indexing operation is performed by downward movements of the rack 244 while leads 52 are located by the guides 55; and the second indexing operation is performed by upward movement of rack 240 while leads 53 are located by the guides 55. The indexing sequence, measured in commutator bar spaces, is 4½, 1½ for the first cycle of the machine and is 5½, ½ for the second cycle.

Cylinders 252 and 255 are suspended from table 72. Cylinders 265 and 270 are supported by a plate 72b mounted upon the upper ends of rods 72a supported by the table 72.

Overtravel of the mechanism for indexing the armature is limited by a brake shown in Figs. 1, 12, and 12A; and, the overtravel is cancelled by a restorating means. The brake comprises the drum 228 (Fig. 15), which is engaged by a brake lining 280, secured to a band 281 having lugs 282 and 283 between which there is located a bar 284 provided by a bracket 285, attached to the plate 224. The lug 283 is urged against the bar 284 by a spring 286 located between the lug 283 and a washer 287 retained by nuts 288 threaded on a rod 289 which extends thru the spring 286 and lug 283 and is fastened to the bar 284.

Movement of the lug 283 toward the right from the bar 284 is limited by the head of the screw 290 which passes thru the bar 284 and is threaded into the lug 283. The lug 282 is urged toward the bar 284 by a spring 291 confined between the lugs 282 and a washer 292 retained by nut 293 threaded on a rod 294 which passes thru the spring 291, the lug 292, the bar 284, the lug 283. The screw 294 has a head 295 located against the right-hand side of the lug 283. This construction shown more clearly in Fig. 12a.

The spring 291 determines the braking friction. If the friction is great enough to prevent all over-travel of the indexing mechanism, its operation by hydraulic means will be slow. The spring 291 is adjusted to allow a relatively rapid operation of the indexing means, while permitting a slight over-travel. The over-travel cancelled by the spring 286 which operates to back-up the indexing mechanism after the rods have stopped. Since rotation of the drum 228 is clockwise in Fig. 12 it is apparent that, when the rotation starts, the spring 286 will yield to permit lug 283 to move toward the right from the bar 284. After the racks stop moving the spring 286 moves the lug 283 left against the bar 284. The springs 286 and 291 are so adjusted that the permitted overtravel is equal to the separation of lug 283 from bar 284 occurring during clockwise movement of the drum 228.

Hydraulic circuits and controls

Referring to Fig. 44 the electric motor 300 operates thru a speed reducer 301 to drive a rotary pump 302 which pump forces fluid thru a distributing pipe 303 and branch pipes 304 through 310, to valves 311 through 317 each of which is operated by a rod 318 carrying a roller 319 and urged toward the right by spring, (not shown) located within the valve. Valves 316 and 317 are manually controlled. The valves 311 through 315 are automatically operated by cams 321 through 325, respectively, all driven by the same shaft 330 in timed relation, as shown in Figs. 44 and 48.

Referring to Fig. 45, shaft 330 is supported by bearing brackets 331 and 332, carried by a base 333. Shaft 330 has a threaded portion 334a which receives a nut 334 for retaining a motor-driven sprocket 335 attached to a clutch member 336. Sprocket 335 has a bearing liner 337 loosely journalled on shaft 330. Shaft 330 has an externally splined portion 338 engaging an internally splined portion in the central bore of a clutch member 339 which is attached by pins 340 to a rod 341 journalled in a bearing bushing 343 having a shank 344 supported by a bracket 345 and retained therein by set screw 346. Bracket 345 is attached to plate 333. The bushing 343 provides an annular flange 347 having diametrically opposite notches 349 for receiving diametrically opposite lugs 350 provided by clutch member 339. Normally the notches 349 receive the lugs 350, since the clutch member 339 is forced downwardly (Fig. 45) by a spring 352 located in a recess 353 provided by a shaft 330 and pressing down on the upper end of the pin 341. The clutch member 338 has clutch teeth 355 for engaging clutch teeth 356 of the member 336 (Fig. 46). The clutch member 339 is caused to engage the clutch member 336 by means of a solenoid 360 having a magnet winding 361 whose connection with an electrical source is controlled by a push-button switch, not shown. When the switch is closed, an armature 362 moves toward a core 363 to cause a button 364 carried by a rod 365 attached to the armature 362 to move upwardly against the action of a spring 366 anchored at 367, thereby pushing the rod 341 upwardly against the action of the spring 352. As soon as the clutch 339 engages the rotating clutch 336 the motor drives sprocket wheel 335, clutch member 339 begins rotating in a clockwise direction as viewed in the direction of arrow 369 (Fig. 45) thereby moving the lugs 350 out of the notches 349. The solenoid 360 is operated only sufficiently to cause that amount of rotation of the member 339 which will move the lugs 350 out of alignment with the notches 349. Thereafter the solenoid may be inoperative but since the lugs 350 ride along the outer flange 348 of the bushing 343, the clutch members will remain in engagement for one-half revolution at the end of which the lugs 350 are pushed by the spring 352 into the notches 340 and the clutch members are disengaged and rotation of the shaft 330 ceases. It is, therefore, apparent that the first cycle of operations of the machine is started by momentarily energizing the solenoid 360. The first cycle is completed at the end of 180° rotation of the shaft 330 and the clutch members are disengaged. The second cycle is started by energizing the solenoid and is completed at the end of another 180° rotation of the shaft when the clutch members are disengaged.

Pipes 371 through 377 connect valves 311 through 317, respectively, with a low pressure return line or drain 378 which returns the pressure fluid to a tank 379 from which the fluid is pumped.

Valve 311 is connected by pipe 220*l* with those ends of the cylinders 220 which are lower in Fig. 44, or at the left in Fig. 16. When cam 321 is in the position shown, there is no pressure oil in the pipe 220*l*. Valve 312 is connected by pipes 200*r* and 200*l*, respectively, with those ends of the cylinder 200 which are top and bottom in Fig. 44, or right and left, respectively, in Fig. 16. When the cam 322 is in the position shown there is pressure fluid in the pipe 200*r* but the pipe 200*l* is connected with the drain. Valve 313 is connected by pipe 270*b* with the bottom of cylinder 270 and by pipe 265*t* with the top of cylinder 265. When cam 323 is in the normal position there is pressure fluid in the bottom of cylinder 270, but none in the top of cylinder 265. Valve 314 is connected by pipes 252*t* and 255*t* with the tops of cylinders 252 and 255 and by pipes 252*b* and 255*b* with the bottoms of cylinders 252 and 255. When the cam 324 is in the position shown there is pressure fluid in the bottoms of cylinders 252 and 255 but none in the tops thereof. Valve 315 is connected by pipes 152*a* and 152*b*, respectively, with the outer ends and the inner ends of cylinders 152. When the cam 225 is in the position shown, there is pressure fluid in the inner ends of the cylinders 152 but none in the outer ends thereof. Valve 316 is connected by pipes 220*r* with those ends of cylinders 220 which are upper in Fig. 44 and right in Fig. 16. When the rod 318 of valve 316 is in the position shown, there is no pressure in the right ends of cylinders 220; but, when the rod 318 is moved toward the left (Fig. 44), the right ends of cylinders 220 receive pressure oil. Valve 317 is connected by pipe 173*r* with the end of cylinder 173 which is upper in Fig. 44 and right in Fig. 16. Valve 317 is connected by pipe with that end of cylinder 173 which is lower in Fig. 44 and left in Fig. 16. When the rod 318 operating valve 317 is in the position shown, pressure fluid is admitted to the pipe 175 thereby causing the cylinder 173 to move down in Fig. 44, or left in Fig. 16, in order to close the chuck around the armature shaft. When the rod 318 of valve 317 is moved toward the left, the lower end of cylinder 173 is connected with drain and the upper end of cylinder 173 is connected with pressure fluid thereby causing it to move up (Fig. 44) and right (Fig. 16) in order to disengage the chuck from the armature shaft.

Résumé of operations

Figure 21:
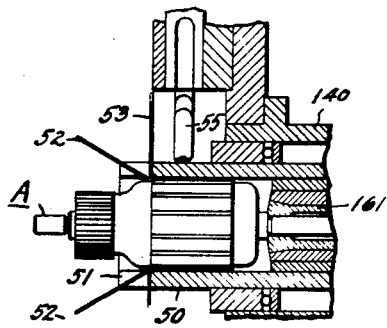
Figure 22:
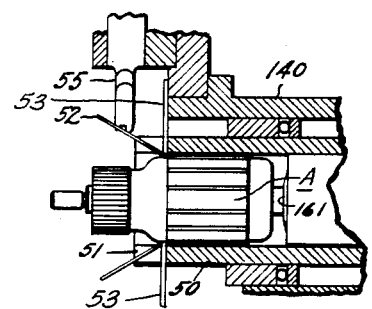

The operations of the first cycle are shown diagrammatically in Figs. 21 thru 29. Before the first cycle starts, the cams located as shown in Figs. 44 and 48 and with the rod 318 of valve 317 pushed in so that the clutch is open. The armature A is inserted as shown in Fig. 21 and is so located that the leads 52 and 53 will be received by the notches 51 of the lead locator 50. The leads 52 are inclined or fanned out as shown in Fig. 21, while the leads 53 are pushed into vertical positions. As the valve rod 318 is released, it moves toward the right to the position shown in Fig. 44, thereby causing the chuck to engage the armature shaft. The operator momentarily energizes the solenoid 360 to operate to connect the driven clutch 339 (Fig. 45) with the driving clutch 336. Then the shaft 330 will rotate 180° and then stop at the end of the first cycle. As the shaft 330 starts rotating clockwise as shown in Figs. 44 and 48, the valves 311 and 312 are so operated that pressure fluid is admitted to the left ends of cylinders 200 and 220. Assuming that the pistons 203 and 221 move at the same speed, by the time the piston 203 is at the position shown in Fig. 18A, the pistons 221 will be located as shown in Fig. 18, lower half. This causes the armature A and the lead locator 50 to move right from the position shown in Fig. 21 to that shown in Fig. 22. There being pressure fluid in the left ends of cylinder 220, the pistons 221 will continue to move toward the left from the position shown in Fig. 18, lower half, to that shown in Fig. 18, upper half. This will cause the lead locator 50 to move from the position shown in Fig. 22 to that shown in Fig. 24, thereby causing the bell crank levers 130 to move from the position shown in Fig. 17 lower half, to the position shown in Fig. 17, upper half, thereby causing the wire guide 55*s* to move from the position shown in Fig. 22 to that shown in Figs. 23 and 24. During this movement of the lead locator 50, while the armature A remains fixed, there is relative movement between the sleeve 192 and the locator 50 as shown by comparing Fig. 17, lower half, with Fig. 17, upper half. This causes further compression of springs 212.

Then the cam 324 actuates the valve 314 so as to admit pressure fluid to the upper ends of cylinders 252 and 255 and to connect the lower ends with the drain. The racks 240 and 244 move downwardly, rack 244 operating thru the gear 243 to rotate the indexing mechanism by engagement of the pawl with the ratchet 241, Fig. 41. There being pressure fluid then in the lower end of the cylinder 270 piston rod 272 is held up so that link 274 is at 274*x* thereby limiting downward movement of the rack 244 to that amount which permits the armature to be indexed so that the angular distance equals two 4½ commutator bar spaces. Then the cam 325 actuates the valve 315 so that the pressure fluid is connected with the outer ends of the cylinders 152 and staking takes place, as shown in Figs. 27 and 28. Then cam 325 releases the actuator 318 of valve 315 so that this valve is actuated by a spring, not shown, so as to connect the inner ends of cylinders 152 with the pressure fluid and the outer ends with drain, so that the staking blades are retracted. Next the cam 323 turns to release the actuator 318 of valve 313 to permit a spring so to actuate the valve 313 that pressure fluid is admitted to the upper end of cylinders 265 and 270 and their lower ends are connected with drain. Then the rack 244 is free to continue its downward movement under the force of pressure fluid then in the upper end of cylinder 254, to permit the rotation of the armature A to the extent of 1½ commutator bar spaces. By comparing Figs. 27 and 29, it will be seen that the staked lead 52 has been rotated 1½ commutator bar spaces.

Before the end of the first cycle and between about 157.5° and 180° rotation of the cam shaft 330, the cams 321 and 322 so operate as to release the actuators 318 of the valves 311 and 312 so as to release the actuators 318 of the valves 311 and 312 so as to permit springs, not shown, within the valves to move these actuators to the position shown in Fig. 44. The valve 311 is then conditioned so that pressure fluid at the left ends of the cylinders 220 is released thereby permitting the springs 212, Fig. 17, to expand and move the locator 50 from the position shown in Fig. 17, upper half, to the position shown in Fig. 17, lower half. This movement causes the guides 55 to be retracted as shown in Fig. 17, lower half.

Between 157.5° and 180° rotation of the shaft 330 cam 322 releases the actuator 318 of the valve 312 thereby permitting a spring, not shown, within the valve 312 to move the actuator 318 to the normal position shown in Fig. 44. This causes pressure fluid to be admitted to the right of the cylinder 200 while its left end is connected with drain. This causes movement of the armature from the position shown in Fig. 17 to that shown in Fig. 19. Since there is no pressure fluid in the cylinder 220 during this movement of the armature into the position shown in Fig. 19, the lead locator 50 moves with the armature chuck sleeve 192 to the position shown in Fig. 19 lower half. This movement of the lead locator 50 with the sleeve 192 is effected by the motion transmitted through the plate 210 attached to sleeve 192, rod 214, springs 212, bushings 211, drum 228 and plate 217 which is attached to locator 50.

Figure 39:
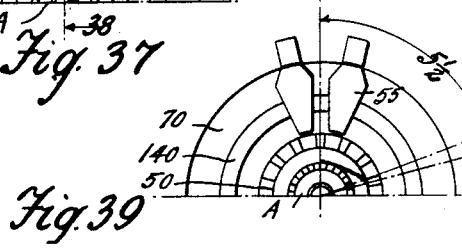

Fig. 30 shows the armature A, lead locator 50, wire guides 55 at the end of the first cycle and at the beginning of the second cycle. Before starting another 180° rotation of the shaft 330 it is necessary to fan out the unstaked leads 53. This is accomplished by a movement to the left, Fig. 44, of the actuator 318 of valve 316 thereby admitting pressure fluid to the left ends of the cylinders 220. This causes the piston 221 to move from the position shown in Fig. 20, lower half, to the position shown in Fig. 20, upper half, thereby causing the lead locator 50 to move from the position shown in Fig. 19, lower half, to Fig. 19, upper half. This causes the leads 53 to move from the position in Fig. 30 to that shown in Fig. 31. During this movement to the left of the lead locator 50 there is relative movement between the locator 50 and the armature chuck sleeve 192 as will be apparent by comparing the upper and lower half of Fig. 19. This relative movement causes additional compression of springs 212 so that, when the leads have been fanned out, as shown in Figs. 19 and 31, the operator may release the actuator 318 of valve 316 so as to permit a spring, not shown, within the valve 316 to move the actuator 318 to the normal position shown in Fig. 44. This releases the pressure at the right ends of cylinder 220 so that the springs 212 may be released and be permitted to expand thereby causing the locator 50 to return to the position shown in Fig. 19, lower half. Then the operator momentarily energizes the solenoid 360 in order to effect thee second 180° of rotation of the shaft 330. The operations performed during the second cycle are the same as those performed during the first cycle with the exception that the indexing mechanism operates in a different manner. Fig. 32 shows that the armature has been moved into the machine so that the commutator is in alignment with the guide 55 and staking blades which are between them, Figs. 33 and 34 show that the wire guides have advanced against the commutator. Figs. 35 and 36 show that the armature has been indexed, this time an amount equivalent to 5½ commutator bar spaces. Figs. 37 and 38 show that the staking blade has advanced against the commutator in order to push the leads 53 into the proper notches of the commutator bars. Fig. 39 shows that after the staking operation the indexing of the armature continues for one-half a commutator bar spaced so that the leads locator will be properly located for the start of the first cycle of operations which is the following after the staked armature has been removed and an unstaked armature inserted. The release of the chuck from the armature shaft is effected as before by removing the actuator 318 of valve 317 toward the left. This permits the staked armature to be removed from the machine and an unstaked armature to be inserted and to be so located that its slots will be in alignment with the notches 51 of the lead locator 50. Then the actuator 318 is released and a spring (not shown) returns it to normal position thereby causing the chuck to grip the armature shaft. Then the rotation of the shaft 330 is started by energizing the solenoid 360 and the machine performs the operation of its first cycle stated heretofore.

Since the indexing mechanism operates differently in second cycle its operation will now be described in detail. At the end of the first cycle there is fluid pressure in the upper ends of the cylinders 265, 252 and 255 so that pistons 264, 251 and 254 are down. There is no pressure fluid in the lower end of cylinder 270, and its piston 271 moves down freely during the downward movement of rack 244 during the first cycle. Following the movement of the wire guides at about 20° of rotation of the shaft 330 during the second cycle or at its 200° position from the start of the first cycle, cam 324 effects such conditioning of the valve 314 that the pressure fluid is admitted to the bottoms of the cylinders 252 and 255 thereby causing racks 240 and 244 to move upwardly. Rack 244 moves upwardly while its pawl 241 rides backward along the ratchet 235. Rack 240 moves upwardly until its head 240h engages the lower end of the screw 260, then at position 260a in Fig. 40. This allows the rack to move from the elevation $l$ to the elevation $m$ in Fig. 40 which is the movement required to effect an indexing of the armature in the amount equivalent to 5½ commutator bar spaces. Following the staking operation in the second cycle which takes place about 270° of the shaft rotation, the cam 323 operates at about 320° to move the actuator 318 of the valve 313 into the position shown thereby relieving the fluid pressure from the top of the cylinder 265 and causing the fluid pressure to enter the bottom of the cylinder 270 then the rack 240 may continue its moving from elevation *m* to elevation *n*, Fig. 40. This movement will effect an indexing of the armature to the extent of a half commutator bar space. This brings the lead locator 50 into the correct angular position before the succeeding first cycle of the machine is begun. Thus at the end of the second cycle the indexing apparatus is so conditioned that both racks 240 and 244 are up and pressure fluid is in lower end of the cylinder 270 in order to provide the necessary stop (through the coaction of link 274 and pin 276, Fig. 40) which limits the downward movement of the rack 244 required for indexing the armature during the first cycle of its operation.

Figure 29:
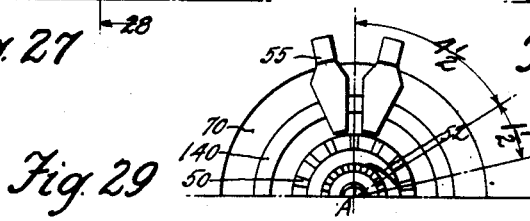

While the machine is at rest after the end of the first cycle and before the second cycle starts the armature is moved out from the front of the machine as shown in Fig. 30 in order that insulating material IW may be wrapped around the staked leads 52. The movement of the leads 52 in the inclined positions as shown in Fig. 31 takes place while the armature is still in the position shown in Fig. 30 and while the leads are in front of the guides 55 and while the guides are retracted and spaced widely apart as shown in Fig. 29. While the armature is still out as shown in Fig. 31, the machine operator has an opportunity to inspect them to see that each is in a notch of lead locator 50 before armature A and locator 50 move into the position shown in Fig. 32.

It is obvious from the foregoing that the present invention is not limited in its embodiment only to a machine which positions the needs of the outer leads within the commutator bar recess. The disclosed machine can readily be adapted for connecting inside leads with the proper commutator bars.

While the embodiment of the present invention as herein disclosed, constitutes a preferred form, it is to be understood that other forms might be adopted, all coming within the scope of the claims which follow.

What is claimed is as follows:

1. A lead-staking machine for operating upon a dynamo armature assembly comprising a slotted core, a plurality of coils completely assembled with the core and having unattached outer leads at least one of which extends from each core slot, a commutator having bars providing recesses to receive lead ends and a shaft for supporting the core and commutator, the inner leads having been previously attached to commutator bars, said machine comprising, in combination, means for rotatably supporting the armature, devices surrounding the commutator for locating outer lead ends to be staked in spaced relation around the commutator and for guiding them toward recesses of the commutator bars, said guiding means providing narrow radial slots which closely confine the lead ends during the entire movement from initial positions in which they are spaced outwardly from the inner leads already attached to commutator bars into positions close to the commutator, means for rotating the armature while the outer lead ends are thus located in order to effect skewing of the leads under tension due to frictional resistance produced by contact with surfaces of the devices as they are pulled between the devices and thereby to pull the outer leads against the connected inner leads and closer to the commutator and to bring the recesses of certain commutator bars into alignment with the outer lead ends to be staked, members surrounding the commutator and having surfaces for moving the lead ends, while guided by the devices, into said commutator bar recesses and also for engaging those portions of the lead ends adjacent the commutator to press them against the connected inner leads, and means for effecting simultaneous operation of the members.

2. A lead-staking machine for operating upon a dynamo armature comprising a slotted core, a plurality of coils completely assembled with the core and having unattached leads at least one of which extends from each core slot, a commutator having bars providing recesses to receive the lead ends and a shaft for supporting the core and commutator, said machine comprising, in combination, means for initially locating the leads to be staked around the commutator in spaced relation approximating the correct relation, means movable into position for finally accurately locating the leads around the commutator and for guiding the leads into the recesses of certain commutator bars, a mechanism for retracting the initial locating means from the leads and for advancing the final locating means as the initial locating means is receding, means for rotating the armature to angularly displace the commutator from the lead ends while they are being confined by the final locating means in order to bring certain commutator bar recesses into alignment with the lead ends thus located, members for moving the lead ends into the bar recesses while confined by the final locating means, and means for moving said members simultaneously.

3. A lead-staking machine for operating upon a dynamo armature comprising a slotted core, a plurality of coils completely assembled with the core and having unattached leads at least one of which extends from each core slot, a commutator having bars providing recesses to receive lead ends and a shaft for supporting the core and commutator, said machine comprising, in combination, a tubular locator surrounding the armature core and having lead receiving recesses at the end thereof adjacent the commutator, the leads to be connected with the commutator by the next operation of the machine, each extending radially and obliquely from the core and through a locator recess whereby said leads are placed in an initial location preparatory to the staking operation, a plurality of lead guides movable radially of the armature toward and away from the commutator, means for concurrently moving the locator longitudinally away from the commutator and the lead guides simultaneously toward the commutator, said guides moving into the spaces between the leads as positioned in the locator, the spaces between the guides becoming narrow as the guides approach the commutator whereby the leads to be staked are finally located in more accurate spaced relation, means for rotating the armature to angularly displace the commutator from the lead ends confined by the guides in order to bring certain commutator bar recesses into alignment with the lead ends thus located, members for moving the lead ends into the bar recesses while confined between the narrowly spaced guides, and means for moving said members simultaneously.

4. A lead-staking machine for operating upon a dynamo armature comprising a slotted core, a plurality of coils completely assembled with the core and having unattached leads at least one of which extends from each core slot, a commutator having bars providing recesses to receive lead ends and a shaft for supporting the core and commutator, said machine comprising, in combination, a chuck for engaging the armature shaft, means for operating the chuck, a tubular locator surrounding the armature core and having lead receiving recesses at the end thereof adjacent the commutator, the leads to be connected with the commutator by the next operation of the machine each extending radially and obliquely from the core and through a locator recess whereby said leads are placed in an initial location preparatory to the staking operation, a plurality of lead guides movable radially of the armature toward and away from the commutator, means for concurrently moving the locator longitudinally away from the chuck, and hence from the commutator, and the lead guides simultaneously toward the commutator, said guides moving into the spaces between the leads as positioned in the locator, the spaces between the guides becoming narrow as the guides approach the commutator whereby the leads to be staked are finally located in more accurate spaced relation, a mechanism providing for said longitudinal movement of the locator relative to the chuck and for the transmission of rotary motion from the locator to the chuck, means for rotating the locator and operating through said mechanism to rotate the chuck with the locator whereby the armature is rotated to angularly displace the commutator from the lead ends confined by the guides in order to bring certain commutator bar recesses into alignment with the lead ends thus located, members for moving the lead ends into the bar recesses while confined between the narrowly spaced guides, and means for moving said members simultaneously.

5. A lead-staking machine for operating upon a dynamo armature comprising a slotted core, a plurality of coils completely assembled with the core and having unattached leads at least one of which extends from each core slot, a commutator having bars providing recesses to receive lead ends and a shaft for supporting the core and commutator, said machine comprising, in combination, a chuck for engaging the armature shaft, means for operating the chuck, a tubular locator surrounding the armature core and having lead receiving recesses at the end thereof adjacent the commutator, the leads to be connected with the commutator by the next operation of the machine each extending radially and obliquely from the core and through a locator recess whereby said leads are placed in an initial location preparatory to the staking operation, a plurality of lead guides movable radially of the armature toward and away from the commutator, a mechanism for transmitting motion rotatively from the locator to the chuck and for transmitting motion longitudinally from the chuck to the locator and providing for longitudinal movement of the locator relative to the chuck, means for longitudinally moving the chuck and operating through said mechanism to move the locator with the chuck from a loading position in front of the machine to an operating position, means for moving the locator longitudinally rearwardly relative to the chuck and hence away from the commutator and for concurrently moving the lead guides simultaneously toward the commutator, said guides moving into the spaces between the leads as positioned by the locator, the spaces between the guides becoming narrow as the guides approach the commutator, whereby the leads to be staked are finally located in more accurate spaced relation, means for rotating the locator and operating through said mechanism to rotate the chuck with the locator whereby the armature is rotated to angularly displace the commutator from the lead ends confined by the guides in order to bring certain commutator bar recesses into alignment with the lead ends thus located, members for moving the lead ends into the bar recesses while confined between the narrowly spaced guides, and means for moving said members simultaneously.

6. A lead-staking machine for operating upon a dynamo armature comprising a slotted core, a plurality of coils completely assembled with the core and having unattached leads at least one of which extends from each core slot, a commutator having bars providing recesses to receive lead ends and a shaft for supporting the core and commutator, said machine comprising, in combination, a collet chuck element having resilient shaft engaging parts, a sleeve having provisions for wedging the chuck parts against the armature shaft, means for producing relative longitudinal movement between the sleeve and chuck element to cause the chuck to engage or disengage the shaft, a tubular locator surrounding the armature core and having lead receiving recesses at the end thereof adjacent the commutator, the leads to be connected with the commutator by the next operation of the machine each extending radially and obliquely from the core and through a locator recess whereby said leads are placed in an initial location preparatory to the staking operation, a plurality of lead guides movable radially of the armature toward and away from the commutator, means for concurrently moving the locator longitudinally away from the commutator and the lead guides simultaneously toward the commutator, said guides moving into the spaces between the leads as positioned by the locator, the spaces between the guides becoming narrow as the guides approach the commutator whereby the leads to be staked are finally located in more accurate spaced relation, a mechanism providing for the transmission of rotary motion from the locator to said chuck engaging sleeve and hence to the armature, means for rotating the locator and operating through said mechanism to rotate the armature to angularly displace the commutator from the lead ends confined by the guides in order to bring certain commutator bar recesses into alignment with the lead ends thus located, members for moving the lead ends into the bar recesses while confined between the narrowly spaced guides, and means for moving said members simultaneously.

7. A lead-staking machine for operating upon a dynamo armature comprising a slotted core, a plurality of coils completely assembled with the core and having unattached leads at least one of which extends from each core slot, a commutator having bars providing recesses to receive lead ends and a shaft for supporting the core and commutator, said machine comprising, in combination, a collet chuck element having resilient shaft engaging parts, a sleeve having provisions for wedging the chuck parts against the armature shaft, means for producing relative longitudinal movement between the sleeve and chuck element to cause the chuck to engage or disengage the shaft, a tubular locator surrounding the armature core and having lead receiving recesses at the end thereof adjacent the commutator, the leads to be connected with the commutator by the next operation of the machine each extending radially and obliquely from the core and through a locator recess whereby said leads are placed in an initial location preparatory to the staking operation, a plurality of lead guides movable radially of the armature toward and away from the commutator, means for transmitting motion longitudinally from the chuck wedging sleeve to the locator and rotary motion from the locator to the sleeve, means for moving the chuck longitudinally and hence the locator from a loading position in front of the machine to an operating position, means for moving the locator relative to the chuck and away from the commutator and for concurrently moving the lead guides simultaneously toward the commutator, said guides moving into the spaces between the leads as positioned by the locator, the spaces between the guides becoming narrow as the guides approach the commutator whereby the leads to be staked are finally located in more accurate spaced relation. means for rotating the locator and hence the chuck and armature to angularly displace the commutator from the lead ends confined by the guides in order to bring certain commutator bar recesses into alignment with the lead ends thus located, members for moving the lead ends with the bar recesses while confined between the narrowly spaced guides, and means for moving said members simultaneously.

8. A lead-staking machine for operating upon a dynamo armature comprising a slotted core, a plurality of coils completely assembled with the core and having unattached leads at least one of which extends from each core slot, a commutator having bars providing recesses to receive lead ends and a shaft for supporting the core and commutator, said machine comprising, in combination, a centrally located rod, a collet chuck attached to one end of the rod and having resilient shaft engaging parts, a tubular, chuck-operating sleeve surrounding the rod, a member attached thereto having provisions for wedging the chuck parts against the armature shaft, means for effecting relative longitudinal movement between the rod and the sleeve in order to cause the chuck to engage or release the armature shaft, a tubular shaft surrounding and supporting the sleeve, a second tubular shaft fixed longitudinally and surrounding the first tubular shaft, means for transmitting rotary motion from the second to the first tubular shaft and permitting longitudinal movement of the first relative to the second, means for transmitting rotary motion from the first tubular shaft to the chuck operating sleeve while permitting longitudinal movement of the first shaft relative to the sleeve, a tubular locator provided by the first tubular shaft surrounding the armature core and having lead receiving recesses at the end thereof adjacent the commutator, the leads to be connected with the commutator by the next operation of the machine each extending radially and obliquely from the core and through a locator recess whereby said leads are placed in an initial location preparatory to the staking operation, a plurality of lead guides movable radially of the armature toward and away from the commutator, means for moving the first shaft relative to the second shaft and to the chuck operating sleeve in order to move the locator away from the commutator and means operated by said movement of the first shaft for moving the lead guides simultaneously toward the commutator, said guides moving into the spaces between the leads as positioned by the locator, the spaces between the guides becoming narrow as the guides approach the commutator whereby the leads to be staked are finally located in more accurate spaced relation, means for rotating the second tubular shaft and operating through said motion transmitting means to rotate the first tubular shaft, chuck and armature to angularly displace the commutator from the lead ends confined by the guides in order to bring certain commutator bar recesses into alignment with the lead ends thus located, members for moving the lead ends into the bar recesses while confined between the narrowly spaced guides, and means for moving said members simultaneously.

9. A lead-staking machine for operating upon a dynamo armature comprising a slotted core, a plurality of coils completely assembled with the core and having unattached leads at least one of which extends from each core slot, a commutator having bars providing recesses to receive lead ends and a shaft for supporting the core and commutator, said machine comprising, in combination, a centrally located rod, a collet chuck attached to one end of the rod and having resilient shaft engaging parts, a tubular chuck operating sleeve surrounding the rod and chuck, a member attached to the sleeve and having provisions for wedging the chuck parts against the armature shaft, means for effecting relative longitudinal movement between the rod and the sleeve in order to cause the chuck to engage or release the armature shaft, a tubular shaft surrounding and supporting the sleeve, a second tubular shaft fixed longitudinally and surrounding the first tubular shaft, an element for transmitting rotary motion from the second to the first tubular shaft and permitting longtudinal movement of the first relative to the second, a tubular locator provided by the first tubular shaft surrounding the armature core and having lead receiving recesses at the end therefor adjacent the commutator, the leads to be connected with the commutator by the next operation of the machine, each extending radially and obliquely from the core and through a locator recess whereby said leads are placed in an initial location preparatory to the staking operation, a plurality of lead guides movable radially of the armature toward and away from the commutator, a mechanism for transmitting motion rotatively from the first tubular shaft to the chuck operating sleeve and for transmitting motion longitudinally from the sleeve to the first tubular shaft and providing for longitudinal movement of the first tubular shaft relative to the sleeve, means for longitudinally moving the chuck and operating through the sleeve and said mechanism to move the first tubular shaft with the chuck from a loading position in front of the machine to an operating position, means for moving the first tubular shaft relative to the second shaft and chuck sleeve in order to move the locator away from the commutator and means operated by said movement of the first shaft for concurrently moving the lead guides simultaneously toward the commutator, said guides moving into the spaces between the leads as positioned by the locator, the spaces between the guides becoming narrow as the guides approach the commutator whereby the leads to be staked are finally located in more accurate spaced relation, means for rotating the second tubular shaft and operating through said element to rotate the first tubular shaft and operating through said mechanism to rotate chuck and armature to angularly displace the commutator from the lead ends confined by the guides in order to bring certain commutator bar recesses into alignment with the lead ends thus located, members for moving the lead ends into the bar recesses while confined between the narrowly spaced guides, and means for moving said members simultaneously.

10. A lead-staking machine for operating upon a dynamo armature comprising a slotted core, a plurality of coils completely assembled with the core and having unattached leads at least one of which extends from each core slot, a commutator having bars providing recesses to receive lead ends and a shaft for supporting the core and commutator, said machine comprising, in combination, a centrally located rod, a collet chuck attached to one end of the rod and having resilient armature shaft engaging parts, means for operating the chuck and comprising a chuck wedging sleeve engageable with the chuck parts to force them against the armature shaft, a tubular sleeve surrounding the rod and attached to the wedging sleeve, a relatively fixed piston connected with the rod and a movable cylinder receiving the piston and connected with the tubular sleeve, means for moving the armature longitudinally from a loading position to an operating position and comprising a fixed cylinder and a movable piston received by the cylinder and connected through the first piston and the rod with the chuck, a tubular shaft surrounding and supporting the tubular sleeve, the chuck, and an armature attached thereto, said tubular shaft being provided with lead receiving recesses at the end thereof adjacent the commutator, the leads to be connected with the commutator by the next operation of the machine, each extending radially and obliquely from the core and through a locating recess whereby said leads are placed in an initial location preparatory to the staking operation, a mechanism for connecting the tubular shaft and tubular sleeve and having means for transmitting rotary motion from the shaft to the sleeve and for permitting longitudinal movement of the shaft relative to the sleeve and having means including a spring for transmitting motion longitudinally from the sleeve to the shaft, said spring yielding when the tubular shaft is moved while the tubular sleeve is fixed, means for moving the tubular shaft longitudinally relative to the tubular sleeve and rearwardly away from the commutator and including a fixed cylinder and a piston movable therein and connected with the shaft, said spring yielding when the shaft is moved by the last named means relative to the sleeve and operating to return the shaft to its normal relation to the sleeve when the last named means becomes non-operative, said last named piston moving idly in its cylinder while the tubular sleeve is being moved by the second named piston and the tubular shaft moves therewith due to motion transmitted by said spring, a plurality of lead guides movable radially of the armature toward the commutator and into the spaces between the leads as positioned by the tubular shaft, the spaces between the guides becoming narrow as they approach the commutator whereby the leads to be staked are finally located in more accurate spaced relation, means operated by the tubular shaft during its rearward movement relative to the tubular sleeve for causing the lead guides to approach the commutator, means for rotating the tubular shaft and through said mechanism the tubular sleeve, chuck and armature to angularly displace the commutator from the lead ends confined by the guides in order to bring certain commutator bar recesses into alignment with the lead ends thus located, members for moving the lead ends into the bar recesses while confined between the narrowly spaced guides, and means for moving said members simultaneously.

11. A lead-staking machine for operating upon a dynamo armature comprising a slotted core, a plurality of coils completely assembled with the core and having unattached leads at least one of which extends from each core slot, a commutator having bars providing recesses to receive lead ends and a shaft for supporting the core and commutator, said machine comprising, in combination, a tubular locator surrounding the armature core and having lead receiving recesses at the end thereof adjacent the commutator, the leads to be connected with the commutator by the next operation of the machine each extending radially and obliquely from the core and through a locator recess whereby said leads are placed in an initial location preparatory to the staking operation, a plurality of lead guides movable radially of the armature toward and away from the commutator, means for concurrently moving the locator longitudinally away from the commutator and the lead guides simultaneously toward the commutator, said guides moving into the spaces between the leads as positioned by the locator, the spaces between the guides becoming narrow as the guides approach the commutator, whereby the leads to be staked are finally located in more accurate spaced relation, means for rotating the armature to angularly displace the commutator from the lead ends confined by the guides in order to bring certain commutator bar recesses into alignment with the lead ends thus located, members for moving the lead ends into the bar recesses while confined between the narrowly spaced guides, means for moving said members simultaneously, and a single control apparatus having operative connection with the guides, locator, the armature rotating means and the means for operating the lead-end moving members for effecting, in sequence, operation of the guide and locator moving means to move the locator away from the leads and the guides into engagement therewith, operation of the armature rotating means and operation of the members which move the lead ends into commutator bar recesses.

12. A lead-staking machine for operating upon a dynamo armature comprising a slotted core, a plurality of coils completely assembled with the core and having unattached leads at least one of which extends from each core slot, a commutator having bars providing recesses to receive lead ends and a shaft for supporting the core and commutator, said machine comprising, in combination, a chuck for engaging the armature shaft, means for operating the chuck, a tubular locator surrounding the armature core and having lead receiving recesses at the end thereof adjacent the commutator, the leads to be connected with the commutator by the next operation of the machine each extending radially and obliquely from the core and through a locator recess whereby said leads are placed in an initial location preparatory to the staking operation, a plurality of lead guides movable radially of the armature toward and away from the commutator, means longitudinally moving the locator and chuck together from a loading position in front of the machine to a rearward operating position, means for moving the locator relative to the chuck and away from the commutator and for concurrently moving the lead guides simultaneously toward the commutator, said guides moving into the spaces between the leads as positioned by the locator, the spaces between the guides becoming narrow as the guides approach the commutator, whereby the leads to be staked are finally located in more accurate spaced relation, means providing for said longitudinal movement of the locator relative to the chuck and for the transmission of rotary motion between the locator and the chuck, means for rotating the locator and thereby the chuck whereby the armature is rotated to angularly displace the commutator from the lead ends confined by the guides in order to bring certain commutator bar recesses into alignment with the lead ends thus located, members for moving the lead ends into the bar recesses while confined between the narrowly spaced guides, means for moving said members simultaneously, and a single control apparatus having operative connections with the means which moves the chuck and locator together, the means which moves the locator relative to the chuck and which concurrently moves the guides, the armature rotating means and the means for operating the lead-end moving members for effecting, in sequence, movement of the chuck and locator together, movement of the locator away from the leads and the guides into engagement therewith, rotation of the armature and operation of the members which move the lead ends into commutator bar recesses.

13. A lead-staking machine for operating upon a dynamo armature comprising a slotted core, a plurality of coils completely assembled with the core and having unattached leads at least one of which extends from each core slot, a commutator having bars providing recesses to receive lead ends and a shaft for supporting the core and commutator, said machine comprising, in combination, a tubular locator surrounding the armature core and having lead receiving recesses at the end thereof adjacent the commutator, the leads to be connected with the commutator by the next operation of the machine each extending radially and obliquely from the core and through a locator recess whereby said leads are placed in an initial location preparatory to the staking operation, a plurality of lead guides movable radially of the armature toward and away from the commutator, means for concurrently moving the locator longitudinally away from the commutator and the lead guides simultaneously toward the commutator, said guides moving into the spaces between the leads as positioned by the locator, the spaces between the guides becoming narrow as the guides approach the commutator, whereby the leads to be staked are finally located in more accurate spaced relation, means capable of rotating the armature a distance equal to a whole multiple of the spacing of the core slots, means for limiting the operation of said means to that angular distance which is required to angularly displace the commutator from the lead ends located by the guides and to bring certain recesses of the commutator bars into alignment with the lead ends thus located, members for moving the lead ends into the bar recesses while confined between the narrowly spaced guides, means for moving said members simultaneously, and a single control apparatus having operative connection with the guides, locator, the armature rotating means, the armature rotation-limiting means and the means for operating the lead-end moving members for effecting, in sequence, the operation of the guide and locator moving means to move the locator away from the leads and the guides into engagement therewith, operation of the armature rotating means with the rotation-limiting means operative, operation of the members which move the lead ends into the commutator bar recesses, and the non-operation of the armature rotation-limiting means whereby the rotation of the armature continues in order to bring the armature to a normal position with respect to the guides.

14. A lead-staking machine for operating upon a dynamo armature comprising a slotted core, a plurality of coils completely assembled with the core and having unattached leads at least one of which extends from each core slot, a commutator having bars providing recesses to receive lead ends and a shaft for supporting the core and commutator, said machine comprising, in combination, a chuck for engaging the armature shaft, means for operating the chuck, a tubular locator surrounding the armature core and having lead receiving recesses at the end thereof adjacent the commutator, the leads to be connected with the commutator by the next operation of the machine each extending radially and obliquely from the core and through a locator recess whereby said leads are placed in an initial location preparatory to the staking operation, a plurality of lead guides movable radially of the armature toward and away from the commutator, means longitudinally moving the locator and chuck together from a loading position in front of the machine to an operating position, means for moving the locator relative to the chuck and away from the commutator and for concurrently moving the lead guides simultaneously toward the commutator, said guides moving into the spaces between the leads as positioned by the locator, the spaces between the guides becoming narrow as the guides approach the commutator, whereby the leads to be staked are finally located in more accurate spaced relation, means providing for said longitudinal movement of the locator relative to the chuck and for the transmission of rotary motion between the locator and the chuck, means capable of rotating the locator and thereby the chuck and hence the armature a distance equal to a whole multiple of the spacing of the core slots, means for limiting the operation of said means to that angular distance which is required to angularly displace the commutator from the lead ends located by the guides and to bring certain recesses of the commutator bars into alignment with the lead ends thus located, members for moving the lead ends into the bar recesses while confined between the narrowly spaced guides, means for moving said members simultaneously, and a single control apparatus having operative connections with the means which moves the chuck and locator together, the means which moves the locator relative to the chuck and which concurrently moves the guides, the armature rotating means, the armature rotation-limiting means and the means for operating the lead-end moving members for effecting, in sequence, movement of the chuck and locator together, movement of the locator away from the leads and the guides into engagement therewith, operation of the armature rotating means with the rotation-limiting means operative, operation of the members which move the lead ends into the commutator bar recesses, and the non-operation of the armature rotation-limiting means whereby the rotation of the armature continues in order to bring the armature to a normal position with respect to the guides.

15. A lead-staking machine for operating upon a dynamo armature assembly comprising a slotted core, a plurality of coils completely assembled with the core and having unattached leads at least two of which extend from each core slot, a commutator having bars providing recesses to receive lead ends and a shaft for supporting the core and commutator, said machine comprising, in combination, a chuck for gripping the armature shaft, means for controlling the chuck, a tubular locator surrounding the armature and having longitudinally extending, lead receiving notches adjacent the commutator and extending to the core, each notch receiving two leads extending from a core slot, the first lead to be attached to commutator bars extending radially and obliquely toward the commutator and the second lead to be attached extending at right angles to the armature shaft, a plurality of guides movable radially of the armature toward and away from the commutator, means for concurrently moving the locator away from the commutator and the guides simultaneously toward the commutator, said guides moving into the spaces between the sets of leads obliquely positioned in the locator, the spaces between the guides becoming narrow as the guides approach the commutator whereby the leads to be staked by the first operation of the machine are finally located in more accurate spaced relation, means for rotating the locator and the armature to angularly displace the commutator from the lead ends confined by the guides and to bring certain commutator recesses into alignment with the lead ends thus located, members for moving the lead ends into the bar recesses, means for moving said members simultaneously, said means for concurrently moving the locator and the guides and said means for simultaneously operating the lead-end moving members operating as before-stated during the second operating cycle of the machine, means operable between the first and second operating cycles of the machine for causing the locator to move toward the commutator end of the armature for causing the second set of leads to be bent into position for guidance by the lead guides, and means operating during the second cycle for rotating the locator and armature to angularly displace the commutator from the second set of lead ends confined by the guides and to bring the recesses of certain other commutator bars into alignment with the second set of lead ends prior to staking.

16. A lead-staking machine for operating upon a dynamo armature assembly comprising a slotted core, a plurality of coils completely assembled with the core and having unattached leads at least two of which extend from each core slot, a commutator having bars providing recesses to receive lead ends and a shaft for supporting the core and commutator, said machine comprising, in combination, a chuck for gripping the armature shaft, means for controlling the chuck, a tubular locator surrounding the armature and having longitudinally extending lead receiving notches adjacent the commutator and extending to the core, each notch receiving two leads extending from a core slot, the first lead to be attached to commutator bars extending radially and obliquely toward the commutator and the second lead to be attached extending at right angles to the armature shaft, a mechanism having means for transmitting rotary motion from the locator to the chuck and having means for transmitting motion longitudinally from the chuck to the locator in either direction while permitting longitudinal movement of the locator relative to the chuck in either direction, means for moving the chuck and operating through said mechanism to move the locator with the chuck from a loading position into an operating position, a plurality of guides movable radially of the armature toward and away from the commutator, means operating through said mechanism for moving the locator either rearwardly or forwardly relative to the chuck, means operated by the rearward movement of the locator relative to the chuck for causing the lead guides to move simultaneously toward the commutator, said guides moving into the spaces between the sets of leads obliquely positioned in the locator, the spaces between the guides becoming narrow as the guides approach the commutator whereby the leads to be staked by the first operation of the machine are finally located in more accurate spaced relation, means for rotating the locator and the armature to angularly displace the commutator from the lead ends confined by the guides and to bring certain commutator recesses into alignment with the lead ends thus located, members for moving the lead ends into the bar recesses, means for moving said members simultaneously, said means for moving the locator and chuck together, said means for moving the locator rearwardly relative to the chuck, and said means for moving the guides toward the commutator and said means for simultaneously operating the lead-end moving members operating as before-stated during the second operating cycle of the machine, said means which moves the locator relative to the chuck being operable between the first and second operating cycles for causing the locator to move forwardly relative to the chuck and toward the commutator end of the armature for causing the second set of leads to be bent into position for guidance by the lead guides, and means operating during the second cycle for rotating the locator and armature to angularly displace the commutator from the second set of lead ends confined by the guides and to bring the recesses of certain other commutator bars into alignment with the second set of lead ends prior to staking.

17. A lead-staking machine for operating upon a dynamo armature assembly comprising a slotted core, a plurality of coils completely assembled with the core and having unattached leads at least two of which extend from each core slot, a commutator having bars providing recesses to receive lead ends and a shaft for supporting the core and commutator, said machine comprising, in combination, a chuck for gripping the armature shaft, means for controlling the chuck, a tubular locator surrounding the armature and having longitudinally extending, lead receiving notches adjacent the commutator and extending to the core, each notch receiving two leads extending from a core slot, the first lead to be attached to commutator bars extending radially and obliquely toward the commutator and the second lead to be attached extending at right angles to the armature shaft, a mechanism for connecting the locator and the chuck and having means for transmitting rotary motion from the locator to the chuck and which provides for longitudinal movement of the locator relative to the chuck and having means including a spring for transmitting motion longitudinally from the chuck to the locator, said spring maintaining a normal relation between the locator and the chuck required for the positioning of the leads in the locator notches as stated, said spring yielding when the locator is moved longitudinally relative to the chuck in either direction while the chuck is fixed longitudinally, means for moving the chuck and operating through said mechanism to move the locator with the chuck from a loading position into an operating position, a plurality of guides movable radially of the armature toward and away from the commutator, means operating through said mechanism for moving the locator either rearwardly or forwardly relative to the chuck, means operated by the rearward movement of the locator relative to the chuck for causing the lead guides to move simultaneously toward the commutator, said guides moving into the spaces between the sets of leads obliquely positioned in the locator, the spaces between the guides becoming narrow as the guides approach the commutator whereby the leads to be staked by the first operation of the machine are finally located in more accurate spaced relation, means for rotating the locator and the armature to angularly displace the commutator from the lead ends confined by the guides and to bring certain commutator recesses into alignment with the lead ends thus located, members for moving the lead ends into the bar recesses, means for moving said members simultaneously, said means for moving the locator and chuck together, said means for moving the locator rearwardly relative to the chuck and said means for moving the guides toward the commutator and said means for simultaneously operating the lead-end moving members operating as before-stated during the second operating cycle of the machine, said means which moves the locator relative to the chuck being operable between the first and second operating cycles and in opposition to the action of the spring for causing the locator to move toward the commutator end of the armature for causing the second set of leads to be bent into position for guidance by the lead guides, and means operating during the second cycle for rotating the locator and armature to angularly displace the commutator from the second set of lead ends confined by the guides and to bring the recesses of certain other commutator bars into alignment with the second set of lead ends prior to staking.

18. A lead-staking machine for operating upon a dynamo armature assembly comprising a slotted core, a plurality of coils completely assembled with the core and having unattached leads at least two of which extend from each core slot, a commutator having bars providing recesses to receive lead ends and a shaft for supporting the core and commutator, said machine comprising, in combination, a chuck for gripping the armature shaft, means for controlling the chuck, a tubular locator surrounding the armature and having longitudinally extending, lead receiving notches adjacent the commutator and extending to the core, each notch receiving two leads extending from a core slot, the first lead to be attached to commutator bars extending radially and obliquely toward the commutator and the second leads to be attached extending at right angles to the armature shaft, a mechanism for connecting the locator and the chuck and having means for transmitting rotary motion from the locator to the chuck and which provides for longitudinal movement of the locator relative to the chuck and having means including a spring for transmitting motion longitudinally from the chuck to the locator, said spring maintaining a normal relation between the locator and the chuck required for the positioning of the leads in the locator notches as stated, said spring yielding when the locator is moved longitudinally relative to the chuck in either direction while the chuck is fixed longitudinally, means for moving the chuck and operating through said mechanism to move the locator with the chuck from a loading position into an operating position, a plurality of guides movable radially of the armature toward and away from the commutator, means acting through said mechanism for moving the locator in either direction relative to the chuck in opposition to said spring and including a fixed cylinder and a movable piston therein connected through said mechanism with the locator means for admitting pressure fluid to an end of the cylinder to effect movement of the locator away from the commutator against the action of said spring, means operated by said movement of the locator for causing the guides to move simultaneously toward the commutator, said guides moving into the spaces between the sets of leads obliquely positioned in the locator, the spaces between the guides becoming narrow as the guides approach the commutator whereby the leads to be staked by the first operation of the machine are finally located in more accurate spaced relation, means for rotating the locator and the armature to angularly displace the commutator from the lead ends confined by the guides and to bring certain commutator recesses into alignment with the lead ends thus located, members for moving the lead ends into the bar recesses, means for moving said members simultaneously, said means for moving the chuck and locator together, said means for admitting pressure fluid to the cylinder whereby the locator and guides are moved concurrently, and said means for simultaneously operating the lead-end moving members operating as before-stated during the second operating cycle of the machine, means operable between the first and second operating cycles for admitting pressure fluid to the other end of said cylinder for effecting, in opposition to the action of said spring, movement of the locator toward the commutator end of the armature for causing the second set of leads to be bent into position for guidance by the lead guides, and means operating during the second cycle for rotating the locator and armature to angularly displace the commutator from the second set of lead ends confined by the guides and to bring the recesses of certain other commutator bars into alignment with the second set of lead ends prior to staking.

19. A lead-staking machine for operating upon a dynamo armature assembly comprising a slotted core, a plurality of coils completely assembled with the core and having unattached leads at least two of which extend from each core slot, a commutator having bars providing recesses to receive lead ends and a shaft for supporting the core and commutator, said machine comprising, in combination, a rotatable armature holder, means for positioning a set of leads comprising one lead from each core slot for entrance into recesses of certain commutator bars, means for staking a set of leads simultaneously into the recesses, means for rotating the armature holder, said means being capable of rotating the holder an angular distance equal to a whole multiple of the spacing of the core slots, means for limiting the rotation of the holder to the angular distance that is required to bring the recesses of certain commutator bars into alignment with the first set of positioned leads to be staked during the first machine cycle, means for limiting rotation of the holder to the angular distance that is required to bring the recesses of certain other commutator bars into alignment with the second set of positioned leads to be staked during the second machine cycle, said first-named-rotation-limiting means being operable and the second-named-rotation-limiting means being non-operative before staking during the first machine cycle and means for reversing the statuses of the rotation-limiting means following the staking operation of the first cycle and for reversing again the statuses of the rotation-limiting means following the staking operation of the second cycle whereby, in either cycle, the rotating means which began operating before the staking operation will complete its operation after the staking operation so that, at the end of either machine cycle, the armature core will be brought into a normal position relative to the lead positioning means.

20. A lead-staking machine for operating upon a dynamo armature assembly comprising a slotted core, a plurality of coils completely assembled with the core and having unattached leads at least two of which extend from each core slot, a commutator having bars providing recesses to receive lead ends and a shaft for supporting the core and commutator, said machine comprising, in combination, a rotatable armature holder, means for positioning a set of leads comprising one lead from each core slot for entrance into recesses of certain commutator bars, means for staking a set of leads simultaneously into the recesses, means for rotating the armature holder comprising two fluid-pressure cylinders, pistons moving in said cylinders, one-way motion transmitters operated respectively by the pistons during one stroke of each thereof for effecting rotation of the holder, the full stroke of each piston being such as to effect rotation of the holder an angular distance equal to a whole multiple of the spacing of the core slots, piston-stroke limiting stops, fluid-pressure cylinders and cooperating pistons respectively for holding the stops in piston-motion arresting positions, each of said limiting stops cooperating with its respective piston to limit its motion to that required for armature rotation sufficient to bring the required commutator bar recesses into alignment with the sets of leads to be staked immediately following armature rotation, valves for controlling the admission of pressure fluid to the cylinders and a valve controller for effecting, during each cycle, a motion-transmitting stroke of one of the armature-rotating pistons with its limiting stop effective and the return stroke of the other armature-rotating piston prior to a staking operation, and for effecting, after the staking operation, the non-operation of said limiting stop and the positioning of the other limiting stop that is to arrest motion of the other armature-rotating piston during the following cycle whereby, at the end of each cycle, the armature moves to a normal position relative to the lead positioning means.

21. A lead-staking machine for operating upon a dynamo armature assembly comprising a slotted core, a plurality of coils completely assembled with the core and having unattached leads at least two of which extend from each core slot, a commutator having bars providing recesses to receive lead ends and a shaft for supporting the core and commutator, said machine comprising, in combination, a rotatable armature holder, means for positioning a set of leads comprising one lead from each core slot for entrance into recesses of certain commutator bars, means for staking a set of leads simultaneously into the recesses, means for rotating the armature holder comprising a common shaft and a ratchet for driving it, two gear segments concentric with the shaft, pawls respectively carried by the segments and engageable with the ratchet, parallel racks mounted one on each side of the ratchet and each meshing with a gear, pistons each connected with a rack, fluid pressure cylinders each receiving a piston and providing a full piston stroke such that the armature will be rotated an angular distance equal to a whole multiple of the spacing of the core slots, stops each for limiting movement of a rack during its armature rotating stroke to that movement required to bring a certain set of commutator bar recesses into alignment with the set of positioned lead ends to be staked, other fluid pressure cylinders and cooperating pistons each for controlling the position of a stop, valves for controlling the admission of pressure fluid to the cylinders, and a valve controller for effecting, during each cycle, before the staking the concurrent movement of the first two pistons in the same direction so that one pawl drives the ratchet while the other backs along the ratchet, the stop associated with the driving rack being positioned for arresting motion of the rack and, after the staking operation, the concurrent movement of the two pistons last mentioned for the purpose of disabling the stop which had arrested movement before the staking operation and for the purpose of positioning the other stop to arrest movement of the other rack during the next operating cycle, motion of the pistons being reversed during the next operating cycle, the armature being located at the end of each cycle so that its core slots are aligned with the spaces between the lead guides.

22. A machine for use in making an armature of a dynamo electric machine, said armature comprising a core, coils thereon having unattached leads two of which extend from each core slot, a commutator providing recesses to receive the leads, alternate bars each receiving a lead extending from a core slot, and a shaft supporting the core and the commutator, said machine comprising, in combination, means for rotatively supporting the armature, with one set of leads extending radially and obliquely to the shaft and the other set of leads extending at right angles to the shaft, radially movable lead guides normally spaced apart relatively widely to receive the obliquely disposed leads, means for moving the lead guides toward the commutator so as to bring them into closely spaced relation with the obliquely disposed leads confined between the guides and located accurately for movement into commutator bar recesses, means for indexing the armature so as to bring certain commutator bar recesses into alignment with the leads thus located, means for inserting the located leads into the commutator bar recesses, and means, which is operated after the insertion of the first set of lead ends, for causing movement of the second set of leads from positions at right angles to the armature shaft to positions oblique to the shaft whereby the second set of leads are located for engagement by the guides.

ERNEST R. FAUSSET.
FOREST L. ZION.